(12) United States Patent
Seo

(10) Patent No.: US 10,133,541 B2
(45) Date of Patent: Nov. 20, 2018

(54) HOST CPU-ASSISTED AUDIO PROCESSING METHOD AND COMPUTING SYSTEM PERFORMING THE SAME

(71) Applicant: SAMSUNG ELECTRONICS CO., LTD., Suwon-si (KR)

(72) Inventor: Hyoung-min Seo, Pyeongtaek-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 75 days.

(21) Appl. No.: 15/338,581

(22) Filed: Oct. 31, 2016

(65) Prior Publication Data
US 2017/0147282 A1 May 25, 2017

(30) Foreign Application Priority Data
Nov. 24, 2015 (KR) .................. 10-2015-0164835

(51) Int. Cl.
| | | |
|---|---|---|
| G06F 17/00 | (2006.01) | |
| G06F 3/16 | (2006.01) | |
| G10L 19/16 | (2013.01) | |
| G11B 20/10 | (2006.01) | |
| G10L 19/26 | (2013.01) | |

(52) U.S. Cl.
CPC .............. G06F 3/165 (2013.01); G10L 19/16 (2013.01); G10L 19/167 (2013.01); G11B 20/10527 (2013.01); G10L 19/26 (2013.01); G11B 2020/10805 (2013.01); G11B 2020/10814 (2013.01)

(58) Field of Classification Search
CPC ....... G06F 3/165; G10L 19/16; G10L 19/167; G10L 19/26; G11B 20/10527; G11B 2020/10805; G11B 2020/10814

USPC ......................................................... 700/94
See application file for complete search history.

(56) References Cited

U.S. PATENT DOCUMENTS

| | | | | |
|---|---|---|---|---|
| 6,301,603 | B1* | 10/2001 | Maher ................... | G06F 9/5044 700/94 |
| 7,107,110 | B2 | 9/2006 | Fay et al. | |
| 7,305,273 | B2 | 12/2007 | Fay et al. | |
| 7,363,095 | B2 | 4/2008 | Hiipakka et al. | |
| 7,778,822 | B2 | 8/2010 | Ohlgren et al. | |
| 7,893,343 | B2 | 2/2011 | Kulkarni et al. | |
| 8,594,816 | B2* | 11/2013 | Jong ...................... | G06F 9/4887 700/94 |
| 2009/0204413 | A1 | 8/2009 | Sintes et al. | |
| 2010/0296676 | A1* | 11/2010 | Fujita ................ | G11B 20/10527 381/119 |
| 2012/0245718 | A1* | 9/2012 | Condit ...................... | H04S 7/00 700/94 |
| 2012/0291053 | A1 | 11/2012 | Carter et al. | |
| 2014/0032755 | A1 | 1/2014 | Huang | |
| 2015/0100809 | A1 | 4/2015 | Belmont et al. | |

* cited by examiner

Primary Examiner — Hemant Patel
(74) Attorney, Agent, or Firm — Sughrue Mion, PLLC

(57) ABSTRACT

An audio processing method and a computing system performing the audio processing method are provided. The computing system includes an audio processing engine and a host central processing unit (CPU). The audio processing engine determines whether it is possible for the audio processing engine to perform a first process for first audio data, based on a run time of the first process for the first audio data, and performs the first process or requests the host CPU to perform the first process, based on a result of the determination.

20 Claims, 16 Drawing Sheets

HOST CPU-ASSISTED AUDIO PROCESSING METHOD AND COMPUTING SYSTEM PERFORMING THE SAME

CROSS-REFERENCE TO RELATED APPLICATION

This application claims priority from Korean Patent Application No. 10-2015-0164835, filed on Nov. 24, 2015 in the Korean Intellectual Property Office, the disclosure of which is incorporated by reference herein in its entirety.

BACKGROUND

Apparatuses, methods and systems consistent with example embodiments relate to an audio processing method, and more particularly, to a host central processing unit assisted (host CPU assisted) audio processing method and a computing system performing the audio processing method.

Audio processing may include, for example, both audio playback for generating a sound by processing audio data and sound recording for generating audio data by processing a received sound. The audio data may be data compressed based on an audio codec, the audio playback may include an operation of decoding compressed source audio data based on an audio codec, and the sound recording may include an operation of encoding a sound based on an audio codec. Also, the audio playback may include post-processing for performing various processes on an audio stream generated when source audio data is decoded, and the sound recording may include preprocessing for performing various processes on an audio stream generated from sound or audio data obtained by encoding an audio stream.

The audio processing may be performed by a processor or a dedicated logic block. When the audio playback or the sound recording is performed, the amount of audio data or a compression rate of data may increase to provide high sound quality. In addition, the complexity of the audio processing may increase to provide various sound effects. Accordingly, high performance hardware may be required to output a sound from audio data within a limited time or to generate audio data from a sound within a limited time. However, such high performance hardware may increase power consumption as well as increase the cost of both the audio hardware and the device in which the audio hardware is used, and thus issues with respect to cost and power in an electronic device for playing back audio data or for recording sound data may arise, particularly in a mobile electronic device.

SUMMARY

One or more exemplary embodiments provide an audio processing method that effectively utilizes resources of a computing system.

One or more exemplary embodiments also provide a computing system performing the audio processing method.

According to an aspect of an exemplary embodiment, there is provided an audio processing method that is performed by a computing system including a host central processing unit (CPU) and an audio processing engine, the audio processing method including: determining, by the audio processing engine, whether it is possible for the audio processing engine to perform a first process for first audio data, based on a run time of the first process for the first audio data; performing, by the audio processing engine, the first process or requesting the host CPU to perform the first process, based on a result of the determining; and generating, by the host CPU, second audio data by performing the first process in response to a request of the audio processing engine.

According to an aspect of another exemplary embodiment, there is provided an audio processing method that is performed by a computing system including a host central processing unit (CPU) and an audio processing engine, the audio processing method including: transmitting, by the host CPU, information about a plurality of processes for audio data to the audio processing engine; determining, by the audio processing engine, whether it is possible for the audio processing engine to perform the plurality of processes, based on run times of the plurality of processes; and performing, by the audio processing engine, at least one of the plurality of processes or requesting the host CPU to perform the at least one of the plurality of processes, based on a result of the determining.

According to an aspect of another exemplary embodiment, there is provided one or more non-transitory computer readable storage devices storing instructions of a program that enables an audio processing method by using a computing system, wherein the computing system comprises a host central processing unit (CPU) and an audio processing engine, wherein the audio processing method comprises: determining, by the audio processing engine, whether it is possible for the audio processing engine to perform a first process for first audio data, based on a run time of the first process for the first audio data; and performing, by the audio processing engine, the first process or requesting the host CPU to perform the first process, based on a result of the determining.

According to an aspect of another exemplary embodiment, there is provided a computing system for performing audio processing, the computing system comprising: a host central processing unit (CPU); and an audio processing engine provided separately from the host CPU, the audio processing engine configured to determine whether it is possible for the audio processing engine to perform a first process for first audio data, based on a run time of the first process for the first audio data, and to perform the first process by the audio processing engine or request the host CPU to perform the first process, based on a result of the determination.

According to an aspect of another exemplary embodiment, there is provided a computing system for performing audio processing, the computing system comprising a host central processing unit (CPU); and an audio processing engine provided separately from the host CPU and being incapable of performing at least one process of a plurality of processes to be performed on audio data at a speed sufficient to output the processed audio data, the audio processing engine configured to determine whether it is possible for the audio processing engine to perform a first process of the plurality of processes, and to perform the first process by the audio processing engine or request the host CPU to perform the first process, based on a result of the determination.

BRIEF DESCRIPTION OF THE DRAWINGS

The above and/or other aspects will be more clearly understood from the following detailed description taken in conjunction with the accompanying drawings in which.

DETAILED DESCRIPTION

Figure 1:
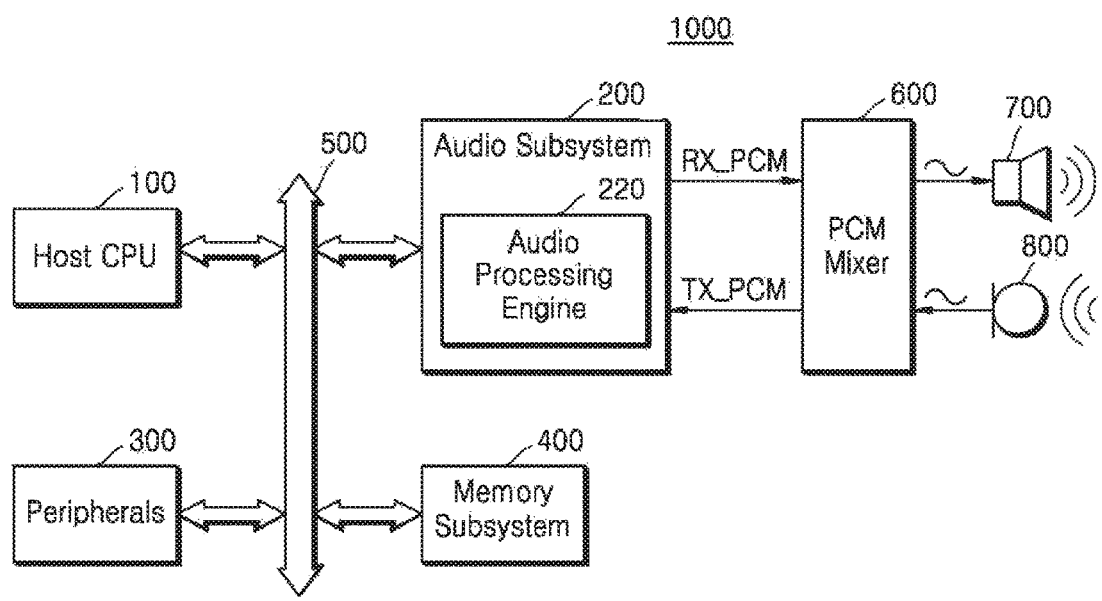
FIG. 1 is a block diagram of a computing system according to an exemplary embodiment.

As used herein, the term "and/or" includes any and all combinations of one or more of the associated listed items. The inventive concept will now be described more fully hereinafter with reference to the accompanying drawings, in which exemplary embodiments of the inventive concept are shown. These exemplary embodiments are provided so that this disclosure is thorough and complete and fully conveys the scope of the inventive concept to one skilled in the art. Accordingly, while the inventive concept can be modified in various ways and take on various alternative forms, specific exemplary embodiments thereof are shown in the drawings and described in detail below as examples. There is no intent to limit the inventive concept to the particular forms disclosed. On the contrary, the inventive concept is to cover all modifications, equivalents, and alternatives falling within the spirit and scope of the appended claims. Like reference numerals refer to like elements throughout. In the drawings, the thicknesses of layers and regions may be exaggerated for clarity.

The terminology used herein is for the purpose of describing particular exemplary embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless explicitly so defined herein.

FIG. 1 is a block diagram of a computing system 1000 according to an exemplary embodiment. Referring to FIG. 1, the computing system 1000 may include a host central processing unit (CPU) 100, an audio subsystem 200, peripherals 300, and a memory subsystem 400, which are connected to a system bus 500 to communicate with one another, and may further include a pulse code modulation (PCM) mixer 600, a speaker 700, and a microphone 800.

As a non-limiting example, the computing system 1000 may be implemented as a personal computer (PC), a tablet PC, a mobile phone, a smart phone, an e-reader, a personal digital assistant (PDA), an enterprise digital assistant (EDA), a digital still camera, a digital video camera, a portable multimedia player (PMP), a personal (or portable) navigation device (PND), or a handheld game console.

The computing system 1000 may output a sound from audio data (or source audio data), or may generate audio data (or target audio data) by receiving a sound generated from the outside of the computing system 1000 and recording the received sound. The audio data may be digital data that may be stored in a computer readable storage device, for example, a semiconductor memory device, or may be data compressed by an audio codec. As a non-limiting example, the audio data may be a file having a filename extension, such as wma, mp3, mpga, rbs, mpeg3, wav, ra, rm, ram, m4a, m4b, mp4, m4r, mp4a, flac, aac, au, mp2, aif, aiff, aifc, amr, awb, ogg, oga, voc, wv, asf, mpc, ac3, mod, s3m, xm, it, 669, amf, ams, dbm, dmf, dsm, far, mdl, med, mtm, okt, ptm, stm, ult, umx, mt2, psm, spx, 3gp, 3gpp, 3ga, 3g2, ape, shn, vqf, tta, qcp, qcelp, dts, caf, gsm, mus, w64, act, opus, alaw, oma, or adx. As described below, the audio subsystem 200 may include an audio processing engine 220 that may include an audio codec for processing the audio data.

The host CPU 100, which is an element for controlling the computing system 1000, may execute a program stored in a memory device included in the memory subsystem 400 or process data stored in the memory device. For example, the host CPU 100 may execute an operating system (OS) or may execute an application program on the OS. The host CPU

100 may be implemented with a multi-core processor including two or more independent and actual processors that may be referred to as cores. The program may include a plurality of instructions, and each of the cores may execute the program by independently executing the instructions.

The audio subsystem 200 may generate RX PCM data RX_PCM by processing source audio data, or may generate audio data by processing TX PCM data TX_PCM that is received from the PCM mixer 600. PCM data, that is, the RX PCM data RX_PCM and/or the TX PCM data TX_PCM, is data that digitally indicates sampled analog signals, and the audio subsystem 200 may send or receive the PCM data RX_PCM and/or TX_PCM to or from the PCM mixer 600. As shown in FIG. 1, the audio subsystem 200 may include the audio processing engine 220. The audio processing engine (APE) 220 is a hardware block for processing source audio data or audio data generated from the source audio data, or for processing audio data generated from the TX PCM data TX_PCM or audio data generated from the TX PCM data TX_PCM. For example, the APE 220 may be a general processor, a digital signal processor (DSP), or a dedicated logic block.

The computing system 1000 may include a dedicated hardware block, such as the audio subsystem 200, to process specific data. As the host CPU 100 may offload the audio data to the audio subsystem 200 for processing, when the audio data is offloaded to the audio subsystem 200 the efficiency of the computing system may increase. For example, the RX PCM data RX_PCM may be consumed at a constant rate while an audio is played back, and to this end, an operation of generating the RX PCM data RX_PCM from source audio data may use a throughput over a certain level. If the host CPU 100 directly processes audio data, the host CPU 100 may perform a process for periodically processing the audio data, and thus, interruption and resumption of an operation of performing another process may be repeated, and as a result, the efficiency of the computing system 1000 may be degraded. As the host CPU 100 may offload the audio processing to the audio subsystem 200 such that the audio subsystem takes charge of the audio processing, the host CPU 100 may perform another process, and thus, the efficiency of the computing system 1000 may increase. The audio processing using an independent hardware block, separated from the host CPU 100, in this manner may be referred to as offload audio processing. An OS that is executed in the host CPU 100 may provide various functions that enable an interface with the audio subsystem 200 (or the audio processing engine 220) to support the offload audio processing.

As the complexity of the audio processing increases, a high performance audio processing engine 220 is required. However, a digital data processing block, such as the host CPU 100 and the audio processing engine 220, may consume a large amount of cost and power due to the increase of data processing capability thereof. Accordingly, the audio processing engine 220 needs to have a performance capability suitable for the audio processing. In other words, in a case in which the audio processing engine 220 has excessively high performance, the audio processing engine 220 may increase the cost and the power consumption of the computing system 1000. On the other hand, in a case in which the audio processing engine 220 has a remarkably low performance capability, the audio processing engine 220 may not be able to normally play back or record a sound because the audio processing engine 200 is not capable of performing a process having a high complexity within a limited time.

According to an exemplary embodiment, the audio processing engine 220 may determine whether it is possible to perform a process of audio processing, based on the complexity of the process forming the audio processing, and may request the host CPU 100 to perform the process or a portion of the process when it is determined that it is not possible for the audio processing engine 220 to perform the process within a limited time. The host CPU 100 may perform the process or the portion of the process in response to the request from the audio processing engine 220. Then, when the host CPU 100 performs the process or the portion of the process, the audio processing engine 220 may provide the RX PCM data RX_PCM generated from source audio data to the PCM mixer 600 or provide target audio data generated from the TX PCM data TX_PCM to another element (e.g., the memory subsystem 400) of the computing system 1000. Since the host CPU 100 having a higher performance than the audio processing engine 220 processes a process having high complexity, a situation in which a sound is interrupted may be avoided, and the sound may thus be normally output or recorded.

The peripherals 300 may include a plurality of logic blocks that perform various respective functions. For example, the peripherals 300 may include a logic block that processes an input of a user, and may include a logic block that supports a communication standard for communicating with a device which is outside the computing system 1000, etc.

The memory subsystem 400 may include one or more memory devices and a memory controller. In an exemplary embodiment, the memory subsystem 400 may include a volatile memory device, and the volatile memory device may function as a cache memory of the host CPU 100 or a data buffer. For example, the memory subsystem 400 may include dynamic random access memory (DRAM), static random access memory (SRAM), mobile DRAM, double data rate synchronous DRAM (DDR SDRAM), low power DDR (LPDDR) SDRAM, graphic DDR (GDDR) SDRAM, or Rambus DRAM (RDRAM) as the volatile memory device.

In an exemplary embodiment, the memory subsystem 400 may include a non-volatile memory device, and the non-volatile memory device may store a plurality of instructions forming a program performed in the host CPU 100 and/or the audio processing engine 220 or store data such as source audio data. The memory subsystem 400 may include electrically erasable programmable read-only memory (EEPROM), a flash memory, phase change random access memory (PRAM), resistance random access memory (RRAM), nano floating gate memory (NFGM), polymer random access memory (PoRAM), magnetic random access memory (MRAM), or ferroelectric random access memory (FRAM) as the non-volatile memory device.

The PCM mixer 600 may generate an analog signal from the RX PCM data RX_PCM, and the generated analog signal may be output as a sound through the speaker 700. Also, the PCM mixer 600 may generate the TX PCM data TX_PCM from an analog signal received from the microphone 800, and the generated TX PCM data TX_PCM may be provided to another element of the computing system 1000. As described above, the PCM mixer 600 may consume the RX PCM data RX_PCM at a constant rate to play back (or output) a sound. If the RX PCM data RX_PCM is not sufficiently supplied (i.e., is not supplied at a sufficient rate for play back), a sound may be interrupted or a sound that is different from source audio data may be output. Similarly, the PCM mixer 600 may generate the TX PCM data TX_PCM at a constant rate to record a sound. If the TX PCM data TX_PCM generated at a constant rate is not sufficiently processed by the audio subsystem 200 (i.e., is not processed at a sufficient rate), generated target audio data may correspond to a sound that is different from a sound at the time of recording.

In FIG. 1, although the PCM mixer 600 transmits or receives the PCM data RX_PCM or TX_PCM to or from the audio subsystem 200, the PCM mixer 600 may transmit or receive the PCM data RX_PCM or TX_PCM to or from another element of the computing system 1000. In an exemplary embodiment, the PCM mixer 600 may support a serial bus interface standard such as an integrated interchip sound (I2S) interface, and may transmit or receive the PCM data RX_PCM or TX_PCM to or from a block supporting the serial bus interface standard, included in the peripherals 300.

Figure 2A:
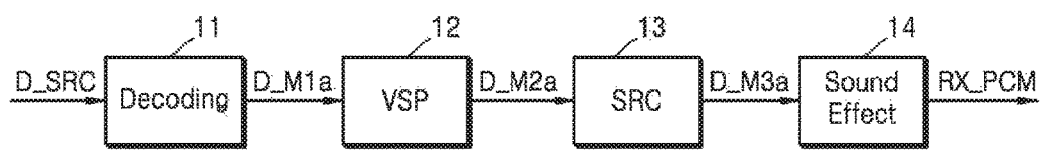
FIGS. 2A and 2B are diagrams illustrating examples of an operation in which a plurality of processes of audio processing are performed.
Figure 2B:
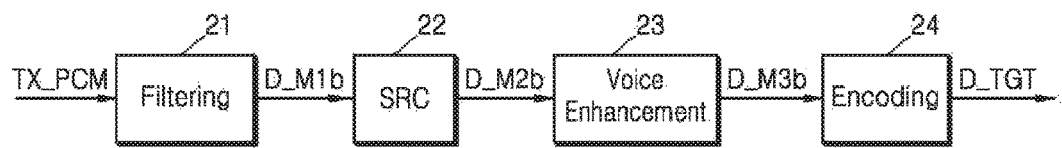

FIGS. 2A and 2B are diagrams illustrating examples of an operation in which a plurality of processes forming audio processing are performed. Specifically, FIG. 2A illustrates an operation of generating RX PCM data RX_PCM from source audio data D_SRC, and FIG. 2B illustrates an operation of generating target audio data D_TGT from TX PCM data TX_PCM. The processes shown in FIGS. 2A and 2B are only examples of a process for audio processing, and various processes, not shown in FIGS. 2A and 2B, may be further performed.

Referring to FIG. 2A, a decoding process 11 may be performed on the source audio data D_SRC. The decoding process 11 may decode the source audio data D_SRC by using an audio codec corresponding to the format of the source audio data D_SRC. First audio data D_M1a generated by decoding the source audio data D_SRC may be stream data including samples listed according to the passage of time.

A variable speed playback (VSP) process 12 may be performed on the first audio data D_M1a, and second audio data D_M2a may be generated. For example, a user of the computing system 1000 may change a sound playback speed, and the VSP process 12 may adjust an audio playback speed by performing interpolation or decimation.

A sampling rate conversion (SRC) process 13 may be performed on the second audio data D_M2a, and third audio data D_M3a may be generated. For example, the source audio data D_SRC may have a sampling rate that is different from a sampling rate that is supported by the computing system 1000 (or the PCM mixer 600). Accordingly, the SRC process 13 may correct the sampling rate of the source audio data D_SRC, which is different from the sampling rate of the computing system 1000, by performing interpolation, decimation, downsampling, or upsampling.

A sound effect process 14 may be performed on the third audio data D_M3a, and RX PCM data RX_PCM may be generated. By performing the sound effect process 14, the computing system 1000 may output a sound, to which a sound effect set by a user or by default has been applied, through the speaker 700. For example, the sound effect may include an echo, a chorus, equalization, a robotic voice effect, and a three-dimensional (3D) audio effect, and the complexity of the sound effect process 14 may be determined depending on an applied sound effect.

Referring to FIG. 2B, a filtering process 21 may be performed on the TX PCM data TX_PCM. The filtering process 21 may be a process for applying a specific type of filter to a sound, and first audio data D_M1b may be generated by applying a digital filter having a limited number of samples to the TX PCM data TX_PCM.

A sampling rate conversion (SRC) process 22 may be performed on the first audio data D_M1b, and second audio data D_M2b may be generated. For example, the target audio data D_TGT may have a sampling rate that is different from a sampling rate that is supported by the computing system 1000 (or the PCM mixer 600). Accordingly, the SRC process 22 may correct the sampling rate of the target audio data D_TGT, which is different from the sampling rate of the computing system 1000, similar to the SRC process 13 of FIG. 2A.

A voice enhancement process 23 may be performed on the second audio data D_M2b, and third audio data D_M3b may be generated. For example, a user of the computing system 1000 may use sound recording of the computing system 1000 to record a voice, and thus, an operation of extracting a voice from the TX PCM data TX_PCM and processing an extracted voice may be performed.

An encoding process 24 may be performed on the third audio data D_M3b. The encoding process 24 may encode the third audio data D_M3b by using an audio codec corresponding to the format of the target audio data D_TGT.

In order to satisfy a throughput over a certain level, a series of processes (that is, the processes 11 to 14) for the source audio data D_SRC and/or a series of processes (that is, the processes 21 to 24) for the TX PCM data TX_PCM have to be completed within a limited time. Accordingly, in a related art offload audio processing system, it may be considered to mount an audio processing engine having high performance thereon to perform a process (for example, the sound effect process 14 or the voice enhancement process 23) having high complexity. However, as described above, the related art audio processing engine having a high performance may cause a high cost and a high power consumption, and may also decrease the efficiency of the offload audio processing system when the process having high complexity is not frequently performed. In addition, even if an audio processing engine having performance suitable for levels of processes at the time of the design of the offload audio processing system is mounted on the offload audio processing system, the audio processing engine may not be able to perform a new process, for example, a process corresponding to a new sound effect, when the new process has a higher complexity than existing processes.

By contrast, in an audio processing method according to an exemplary embodiment, the host CPU 100 may perform a process or a portion of the process having a high complexity, and thus, the audio processing engine 220 may be optimally provided considering cost, power consumption and performance, and the computing system 1000 may be able to perform a new process having a higher complexity than the existing processes due to the ability to offload the new process or a portion of the new process to be performed by the host CPU 100.

Figure 3:
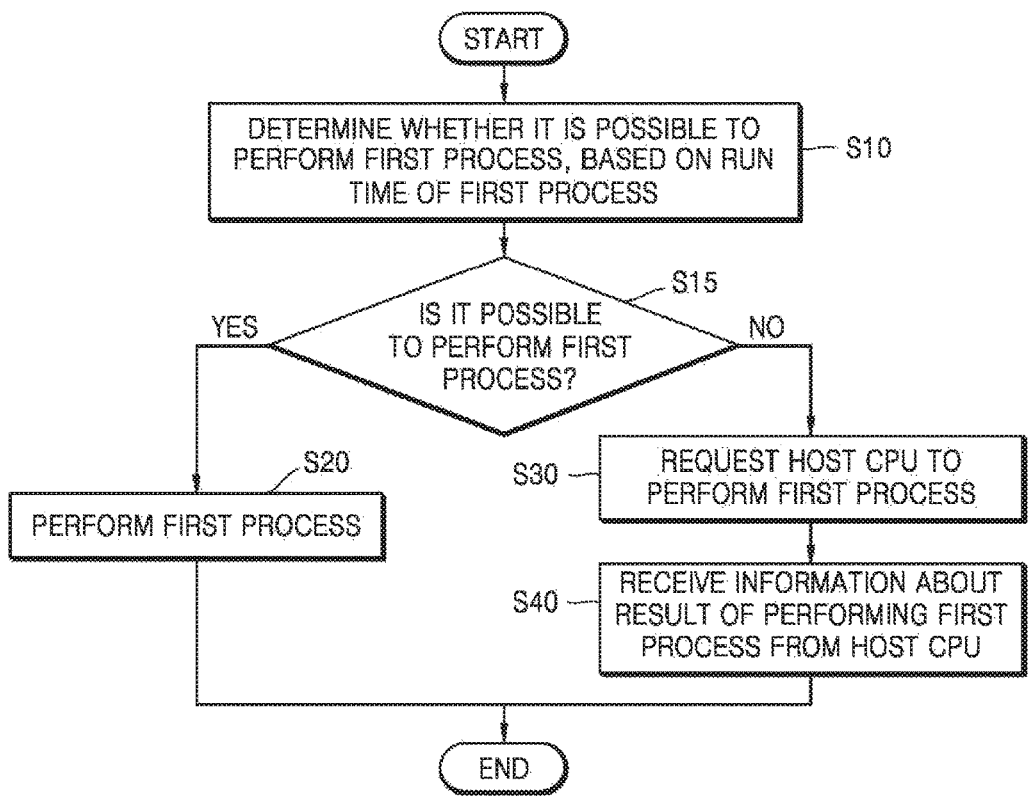
FIG. 3 is a flowchart of an operating method of an audio processing engine of the computing system of FIG. 1, according to an exemplary embodiment.

FIG. 3 is a flowchart illustrating an operating method of the audio processing engine 220 of the computing system 1000 of FIG. 1, according to an exemplary embodiment. Specifically, FIG. 3 illustrates an operating method of the audio processing engine 220 from the start of a first process to the end of the first process. It will be understood that the operating method may be applied to any of the processes that make up the operations performed by the audio processing engine 220, for example, any of the processes shown in FIGS. 2A and 2B. The operating method of the audio processing engine 220, illustrated in FIG. 3, may be performed by executing a plurality of instructions of a software program when the audio processing engine 220 is implemented with a processor, or may be performed by a state machine when the audio processing engine 220 is implemented with a dedicated logic block. As shown in FIG. 3, the operating method of the audio processing engine 220 may include operations S10 to S40.

In operation S10, the audio processing engine 220 may determine whether it is possible to perform the first process, based on a run time of the first process. The first process may be one of a plurality of processes for audio data or PCM data. The run time of the first process may refer to an execution time when the first process is performed in the audio processing engine 220, and may be long when the first process has a high complexity. As described below, the audio processing engine 220 may acquire information about the run time of the first process by using various methods, and may determine whether it is possible to perform the first process, based on the run time of the first process. For example, the audio processing engine 220 may determine, based on the run time of the first process, whether the audio processing engine 220 may generate the RX PCM data RX_PCM at a rate that is equal to or greater than that at which the PCM mixer 600 consumes the RX PCM data RX_PCM when the audio processing engine 220 performs the first process. In addition, the audio processing engine 220 may determine, based on the run time of the first process, whether the audio processing engine 220 may process the TX PCM data TX_PCM at a rate that is equal to or greater than that at which the PCM mixer 600 generates the TX PCM data TX_PCM when the audio processing engine 220 performs the first process.

If it is determined in operation S15 that it is possible to perform the first process (S15, YES), the audio processing engine 220 may perform the first process in operation S20. If it is determined in operation S15 that it is not possible to perform the first process (S15, NO), the audio processing engine 220 may request the host CPU 100 to perform the first process in operation S30. In some cases, the audio processing engine 220 may request the host CPU 100 to perform a portion of the first process. The host CPU 100 may perform the first process or the portion of the first process in response to the request of the audio processing engine 220. In operation S40, the audio processing engine 220 may receive information about a result of performing the first process from the host CPU 100. In some cases, the audio processing engine 220 may receive information about a result of performing the portion of the first process from the host CPU 100. In some exemplary embodiments, the operating method is applied to each of the processes of the operating method. That is, for each process of the operating method, the audio processing engine 220 determines whether to perform the process or to request the host CPU 100 to perform the process or a portion of the process. Hereinafter, operations S10 to S40 of FIG. 3 will be described in more detail with reference to drawings.

Figure 4:
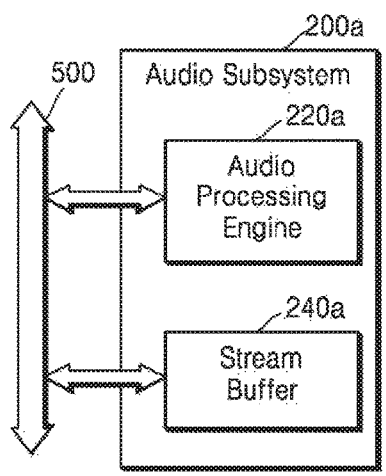
FIG. 4 is a block diagram illustrating an example of an audio subsystem of the computing system of FIG. 1, according to an exemplary embodiment.

FIG. 4 is a block diagram of an audio subsystem 200a, which is an example of the audio subsystem 200 of the computer system 1000 of FIG. 1, according to an exemplary embodiment. As described with reference to FIG. 1, the audio subsystem 200a may generate the RX PCM data RX_PCM from source audio data, or generate target audio data from the TX PCM data TX_PCM.

Referring to FIG. 4, the audio subsystem 200a may include an audio processing engine 220a and a stream buffer 240a. The audio processing engine 220a and the stream buffer 240a may communicate with other elements of the computing system 1000 via the system bus 500. The stream buffer 240a may store data generated when a process for the source audio data is performed, or data generated when a process for the TX PCM data TX_PCM is performed. For example, the stream buffer 240a may store the first to third audio data D_M1a to D_M3a of FIG. 2A and/or the first to third audio data D_M1b to D_M3b of FIG. 2B, or some portion thereof, and may also store the PCM data RX_PCM or TX_PCM or some portion thereof. The PCM mixer 600 may receive the RX PCM data RX_PCM stored in the stream buffer 240a and generate an analog signal, and may also generate the TX PCM data TX_PCM and store the generated TX PCM data TX_PCM in the stream buffer 240a.

Figure 5A:
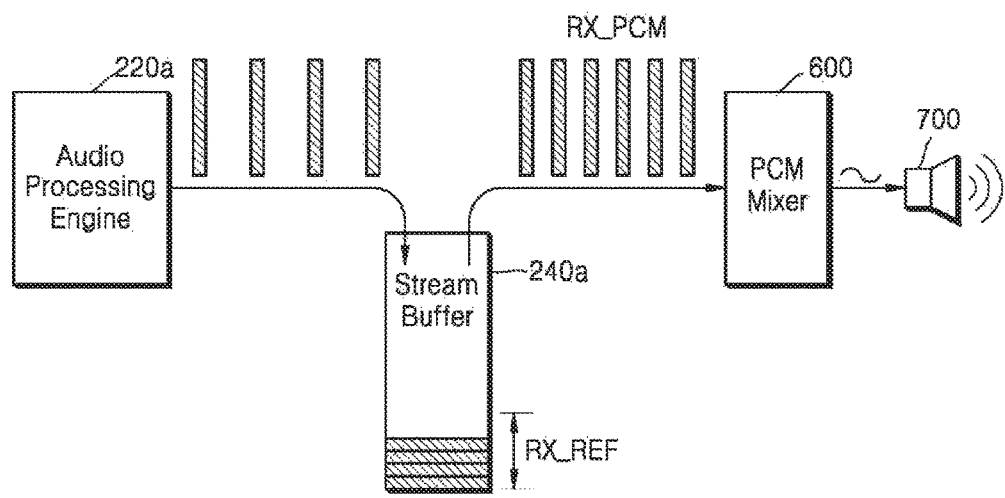
FIGS. 5A and 5B are diagrams illustrating operations of a stream buffer of the audio subsystem of FIG. 4 when a process having high complexity is performed on source audio data.
Figure 5B:
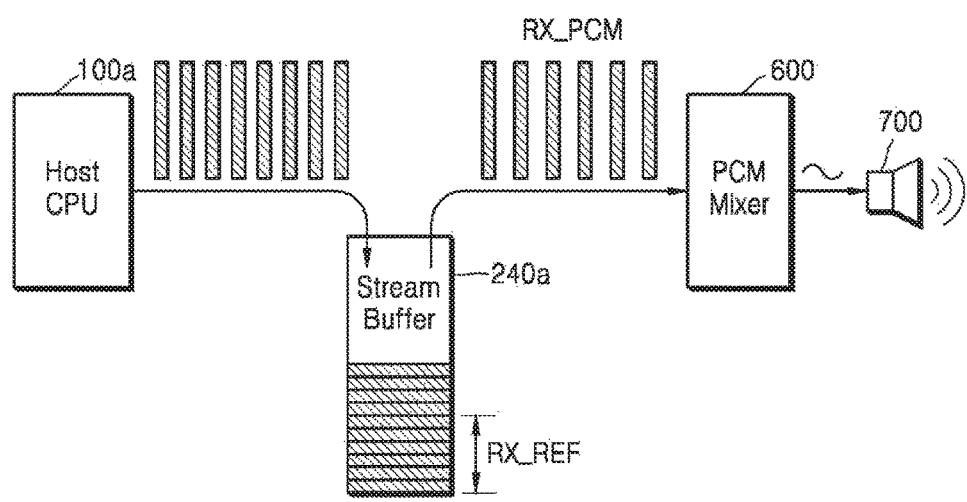

FIGS. 5A and 5B are diagrams illustrating operations of the stream buffer 240a of the audio subsystem 200a of FIG. 4 when a process having high complexity is performed on source audio data. Specifically, FIG. 5A illustrates an operation of the stream buffer 240a when a process having high complexity is performed by the audio processing engine 220a of FIG. 4, and FIG. 5B illustrates an operation of the stream buffer 240a when a process having high complexity is performed by a host CPU 100a.

In FIGS. 5A and 5B, it is assumed that the stream buffer 240a may store RX PCM data RX_PCM and the process having high complexity is a final process of a plurality of processes and is a process of generating the RX PCM data RX_PCM that is transmitted to the PCM mixer 600. As shown in FIGS. 5A and 5B, the PCM mixer 600 may consume the RX PCM data RX_PCM at a constant rate to generate an analog signal and transmit the generated analog signal to a speaker 700.

In order for the PCM mixer 600 to stably generate an analog signal, the RX PCM data RX_PCM may be supplied so that the stream buffer 240a may store RX PCM data RX_PCM that is equal to or greater than a reference amount RX_REF, which may be an amount of RX PCM data RX_PCM which corresponds to a sound to be played back during a certain time period. For example, the reference amount RX_REF may be an amount of RX PCM data RX_PCM which corresponds to a sound to be played back during about 40 ms. A phenomenon in which, while a sound is played back, the stream buffer 240a stores RX PCM data RX_PCM that is less than the reference amount RX_REF may be referred to as an underrun. The RX PCM data RX_PCM is supplied to the stream buffer 240a so that an underrun does not occur in the stream buffer 240. On the other hand, the RX PCM data RX_PCM may be supplied so that an amount of RX PCM data RX_PCM stored in the stream buffer 240a exceeds the reference amount RX_REF. For example, when a sound effect is added, changed, or cancelled according to an input of a user during the playback of a sound in a state in which the stream buffer 240a stores an amount of RX PCM data RX_PCM that is greater than the reference amount RX_REF, a sound in which the input of the user has been reflected may be delayed and the delayed sound may be output.

Referring to FIG. 5A, the audio processing engine 220a having performance that is lower than that of the host CPU 100a may generate RX PCM data RX_PCM at a rate, which is lower than that at which the PCM mixer 600 consumes the RX PCM data RX_PCM, when performing a process having high complexity. Accordingly, an amount of RX PCM data RX_PCM stored in the stream buffer 240a may gradually decrease, and as shown in FIG. 5A, a phenomenon (that is, underrun) in which an amount of RX PCM data RX_PCM stored in the stream buffer 240a is less than the reference amount RX_REF may occur.

Referring to FIG. 5B, the host CPU 100a having performance that is higher than that of the audio processing engine 220a may generate RX PCM data RX_PCM at a rate, which is equal to or greater than that at which the PCM mixer 600 consumes the RX PCM data RX_PCM, when performing a process having high complexity. Accordingly, as shown in FIG. 5B, an amount of RX PCM data RX_PCM stored in the stream buffer 240a may be greater than the reference amount RX_REF, and thus, the PCM mixer 600 may stably generate an analog signal.

Figure 6:
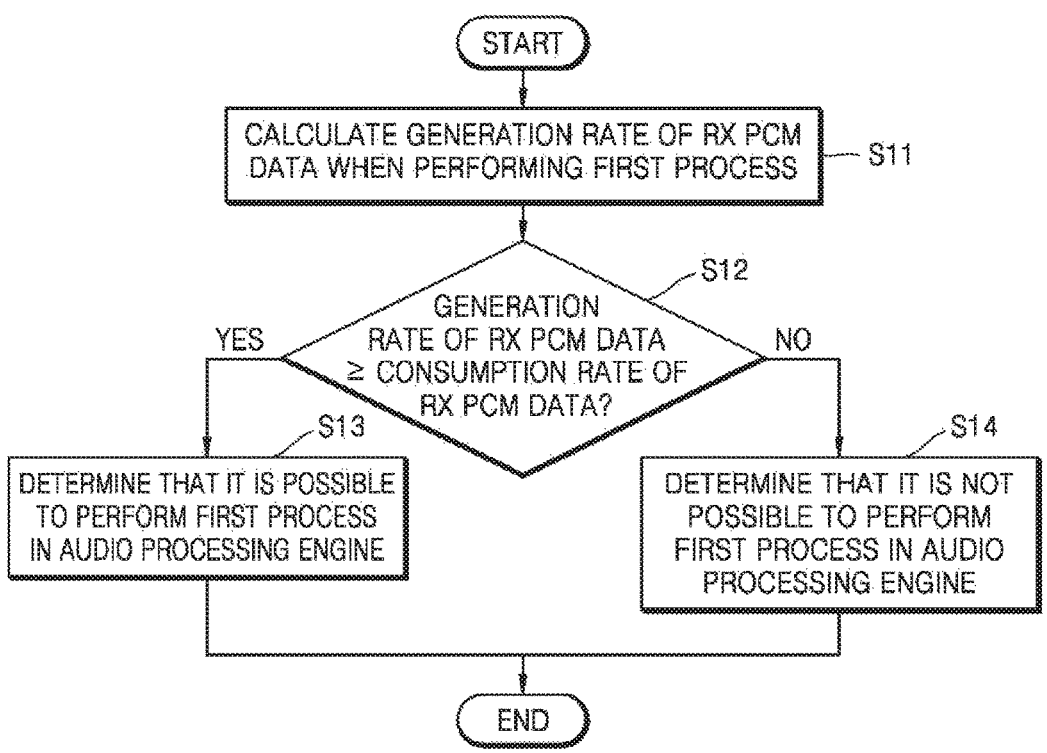
FIG. 6 is a flowchart illustrating an example of operation S10 of the operating method of FIG. 3, according to an exemplary embodiment.

FIG. 6 is a flowchart illustrating an example of operation S10 of FIG. 3, according to an exemplary embodiment. As described above with reference to FIG. 3, the audio processing engine 220 may determine in operation S10 whether it is possible to perform a first process, based on a run time of the first process. In the example of FIG. 6, the first process may be one of post-processes for source audio data.

Referring to FIG. 6, the audio processing engine 220 may calculate a generation rate of RX PCM data RX_PCM when performing the first process (operation S11). For example, the audio processing engine 220 may calculate a generation rate of RX PCM data RX_PCM when the audio processing engine 220 performs the first process based on the run time of the first process.

In operation S12, the audio processing engine 220 may compare the generation rate of the RX PCM data RX_PCM to a consumption rate of the RX PCM data RX_PCM. In other words, the audio processing engine 220 may compare the generation rate of the RX PCM data RX_PCM, calculated in operation S11, to a rate at which the PCM mixer 600 consumes the RX PCM data RX_PCM.

When the generation rate of the RX PCM data RX_PCM is equal to or greater than the consumption rate of the RX PCM data RX_PCM (S12, YES), the audio processing engine 220 may determine that it is possible to perform the first process in the audio processing engine 220 (operation S13). On the other hand, when the generation rate of the RX PCM data RX_PCM is less than the consumption rate of the RX PCM data RX_PCM (S12, NO), an underrun may occur as shown in FIG. 5A, and thus, the audio processing engine 220 may determine that it is not possible to perform the first process in the audio processing engine 220 (operation S14).

Figure 7A:
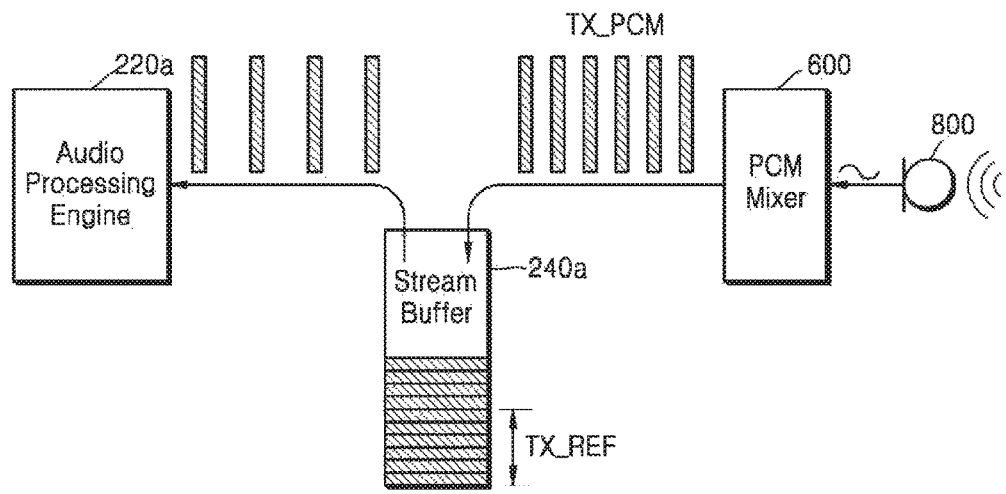
FIGS. 7A and 7B are diagrams illustrating an operation of a stream buffer of the audio subsystem of FIG. 4 when a process having high complexity is performed to generate target audio data.
Figure 7B:
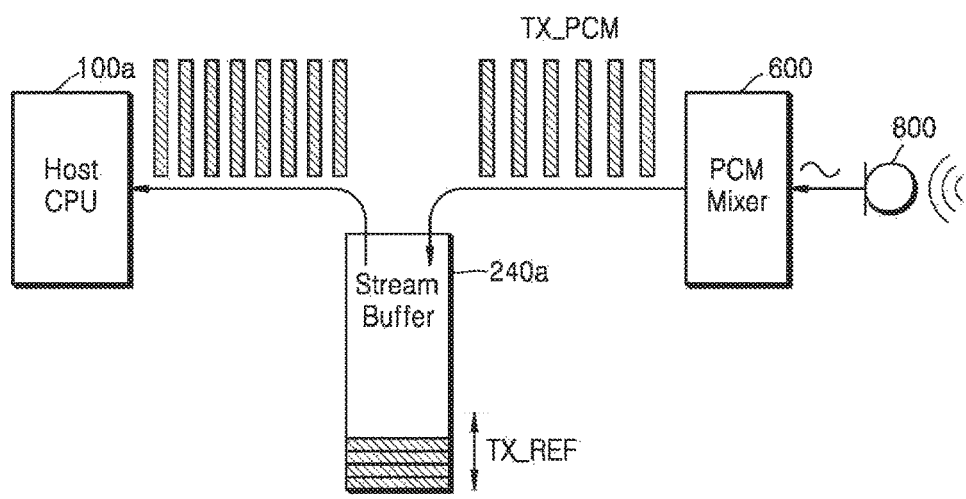

FIGS. 7A and 7B are diagrams illustrating an operation of the stream buffer 240a of FIG. 4 when a process having high complexity is performed to generate target audio data. Specifically, FIG. 7A illustrates an operation of the stream buffer 240a when a process having high complexity is performed by the audio processing engine 220a of FIG. 4, and FIG. 7B illustrates an operation of the stream buffer 240a when a process having high complexity is performed by the host CPU 100a.

In FIGS. 7A and 7B, it is assumed that the stream buffer 240a may store TX PCM data TX_PCM and the process having high complexity is a first process of a plurality of processes and is a process of processing the TX PCM data TX_PCM that is received from the PCM mixer 600. As shown in FIGS. 7A and 7B, the PCM mixer 600 may receive an analog signal from the microphone 800 and thus generate the TX PCM data TX_PCM at a constant rate.

In order not to omit an analog signal that is received by the PCM mixer 600, that is, in order to record a sound without omission, the TX PCM data TX_PCM may be processed or consumed so that TX PCM data TX_PCM which is equal to or less than a reference amount TX_REF may be stored in the stream buffer 240a. For example, the reference amount TX_REF may be an amount of TX PCM data TX_PCM which corresponds to a sound received during about a certain period of time, for example about 40 ms. A phenomenon in which, while a sound is recorded, the stream buffer 240a stores TX PCM data TX_PCM that exceeds the reference amount TX_REF may be referred to as an overflow. The TX PCM data TX_PCM is processed or consumed in the stream buffer 240a so that an overflow does not occur in the stream buffer 240.

Referring to FIG. 7A, the audio processing engine 220a having performance that is lower than that of the host CPU 100a may process TX PCM data TX_PCM at a rate, which is lower than that at which the PCM mixer 600 supplies the TX PCM data TX_PCM, when performing a process having high complexity. Accordingly, an amount of TX PCM data TX_PCM stored in the stream buffer 240a may gradually increase, and as shown in FIG. 7A, a phenomenon (that is, overflow) in which an amount of TX PCM data TX_PCM stored in the stream buffer 240a is greater than the reference amount TX_REF may occur.

Referring to FIG. 7B, the host CPU 100a having performance that is higher than that of the audio processing engine 220a may process TX PCM data TX_PCM at a rate, which is equal to or greater than that at which the PCM mixer 600 supplies the TX PCM data TX_PCM, when performing a process having high complexity. Accordingly, as shown in FIG. 7B, an amount of TX PCM data TX_PCM stored in the stream buffer 240a may be greater than the reference amount TX_REF, and thus, the TX PCM data TX_PCM that is supplied from the PCM mixer 600 may be processed without omission.

Figure 8:
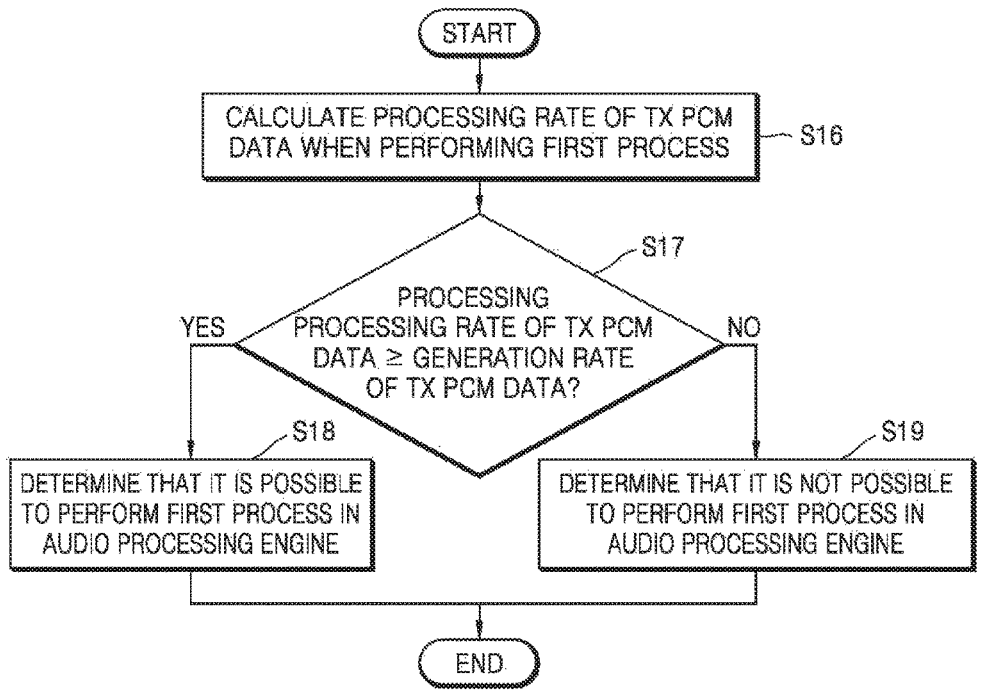
FIG. 8 is a flowchart illustrating an example of operation S10 of the operating method of FIG. 3, according to an exemplary embodiment.

FIG. 8 is a flowchart illustrating an example of operation S10 of FIG. 3, according to an exemplary embodiment. As described above with reference to FIG. 3, the audio processing engine 220 may determine in operation S10 whether it is possible to perform a first process, based on a run time of the first process. In the example of FIG. 8, the first process may be one of pre-processes for generating target audio data from a sound.

Referring to FIG. 8, the audio processing engine 220 may calculate a processing rate of TX PCM data TX_PCM when performing the first process (operation S16). For example, the audio processing engine 220 may calculate the processing rate of TX PCM data TX_PCM when the audio processing engine 220 performs the first process based on the run time of the first process.

In operation S17, the audio processing engine 220 may compare the processing rate of the TX PCM data TX_PCM to a generation rate of the TX PCM data TX_PCM. In other words, the audio processing engine 220 may compare the processing rate of the TX PCM data TX_PCM, calculated in operation S16, to a rate at which the PCM mixer 600 generates (or supplies) the TX PCM data TX_PCM.

When the processing rate of the TX PCM data TX_PCM is equal to or greater than the generation rate of the TX PCM data TX_PCM (S17, YES), the audio processing engine 220 may determine that it is possible to perform the first process in the audio processing engine 220 (operation S18). On the other hand, when the processing rate of the TX PCM data TX_PCM is less than the generation rate of the TX PCM data TX_PCM (S17, NO), an overflow may occur as shown in FIG. 7A, and thus, the audio processing engine 220 may determine that it is not possible to perform the first process in the audio processing engine 220 (operation S19).

Figure 9:
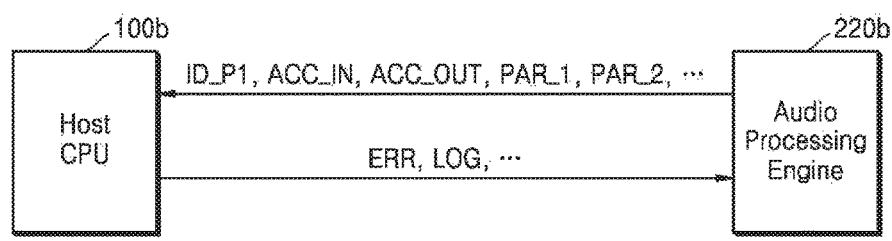
FIG. 9 is a diagram illustrating data moving between a host central processing unit (CPU) and an audio processing engine in operations S30 and S40 of the operating method of FIG. 3, according to an exemplary embodiment.

FIG. 9 is a diagram illustrating data moving between the host CPU 100b and the audio processing engine 220b in operations S30 and S40 of FIG. 3, according to an exemplary embodiment. As described above with reference to FIG. 3, the audio processing engine 220b may request the host CPU 100b to perform a first process (operation S30), and may receive information about a result of performing the first process from the host CPU 100B (operation S40).

When the audio processing engine 220*b* requests the host CPU 100*b* to perform the first process, information about the performing of the first process may be transmitted to the host CPU 100*b*. The host CPU 100*b* may perform the first process based on information received from the audio processing engine 220*b*. For example, as shown in FIG. 9, an identifier ID_PI of the first process, access information ACC_IN of input data, access information ACC_OUT of output data, and a plurality of parameters PAR_1, PAR_2, etc. may be transmitted from the audio processing engine 220*b* to the host CPU 100*b* as information about the first process.

The identifier ID_PI of the first process may let the host CPU 100*b* know that a process which the audio processing engine 220*b* has requested the host CPU 100*b* to perform is the first process, and the host CPU 100B may recognize the first process due to the identifier ID_PI of the first process and then perform the first process.

The access information ACC_IN of input data may include access information about data corresponding to a target of the first process. For example, data corresponding to a target of the first process may be stored in a memory device (for example, DRAM) included in the memory subsystem 400 of FIG. 1. The access information ACC_IN of input data may include a start address of data stored in the DRAM, and the host CPU 100*b* may access the DRAM based on the start address and receive input data of the first process from the DRAM.

The access information ACC_OUT of output data may include access information about data that is generated when the first process is performed. For example, data that is generated when the first process is performed by the host CPU 100*b* may be stored in the memory device (for example, DRAM) included in the memory subsystem 400 of FIG. 1. The audio processing engine 200*b* may designate an address at which data generated when the first process is performed is to be stored, and the access information ACC_OUT of output data may include the address at which the generated data is to be stored. The host CPU 100*b* may access the DRAM, based on the address at which the generated data is to be stored, and store output data of the first process in the DRAM.

The plurality of parameters PAR_1, PAR_2, etc. may define the property of the first process as parameters of the first process. For example, when the first process corresponds to an operation of using an echo effect as a sound effect, one of the plurality of parameters PAR_1, PAR_2, etc. may have a value indicating the degree of the echo effect. When the first process corresponds to an operation of using equalization, at least one of the plurality of parameters PAR_1, PAR_2, etc. may have a value that indicates the type of filter or defines characteristics of the filter. The host CPU 100*b* may perform the first process based on the plurality of parameters PAR_1, PAR_2, etc.

The host CPU 100*b* may perform the first process and transmit information about a result of performing the first process to the audio processing engine 220. The audio processing engine 220*b* may check whether the first process has been completely performed, based on the information about the result of performing the first process, and may refer to the information about the result of performing the first process when performing a subsequent process. For example, as shown in FIG. 9, error information ERR, log information LOG, and the like may be transmitted from the host CPU 100*b* to the audio processing engine 220*b* as the information about the result of performing the first process.

The error information ERR may include information about an error occurring when the host CPU 100*b* performs the first process. For example, when the first process corresponding to the identifier ID_P1 of the first process received from the audio processing engine 220*b* is not detected or input data is not accessible according to the access information ACC_IN of input data, the first process may not be normally performed and the host CPU 100*b* may transmit error information ERR, which includes a reason why the first process has not been normally performed, to the audio processing engine 220*b*. In addition, even in the case that the host CPU 100*b* has completed the performing of the first process, the host CPU 100*b* may transmit error information ERR, which includes information about an error that has occurred while the first process is performed, to the audio processing engine 220*b*. For example, when the parameter PAR_1, which is a first parameter, exceeds an allowed maximum value, the host CPU 100*b* may complete the performing of the first process by using the allowed maximum value, and may transmit error information ERR, which includes content in which the first parameter PAR_1 has exceeded the allowed maximum value, to the audio processing engine 220*b*.

The log information LOG may include information about events occurring when the host CPU 100 performs the first process. For example, the log information LOG may include a time used to perform the first process, the size of output data, and share of the first process in the host CPU 100. The audio processing engine 220 may perform a subsequent process based on received log information LOG, and may refer to the log information LOG when requesting the host CPU 100 to perform the first process.

Figure 10A:
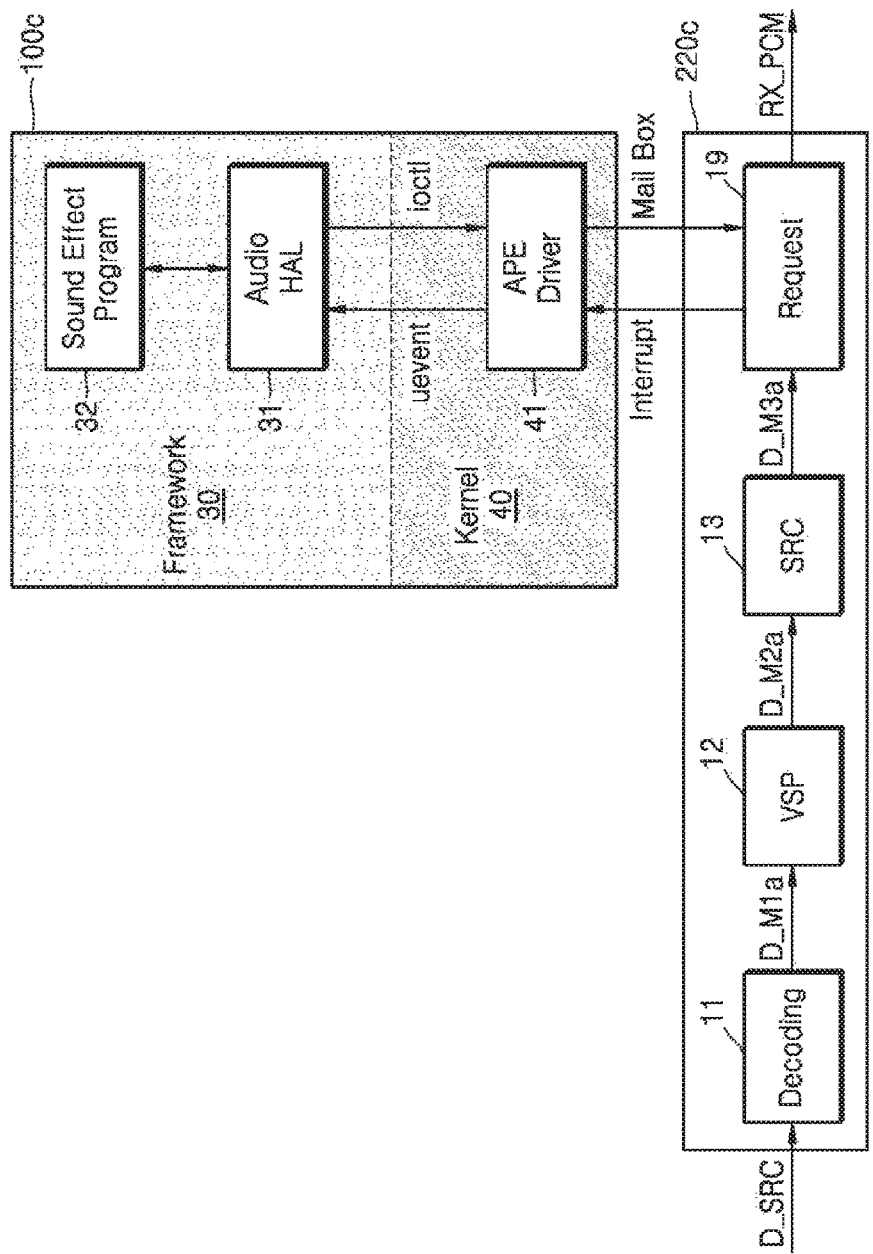
FIGS. 10A and 10B are diagrams illustrating operations of a host CPU and an audio processing engine, according to an exemplary embodiment.
Figure 10B:
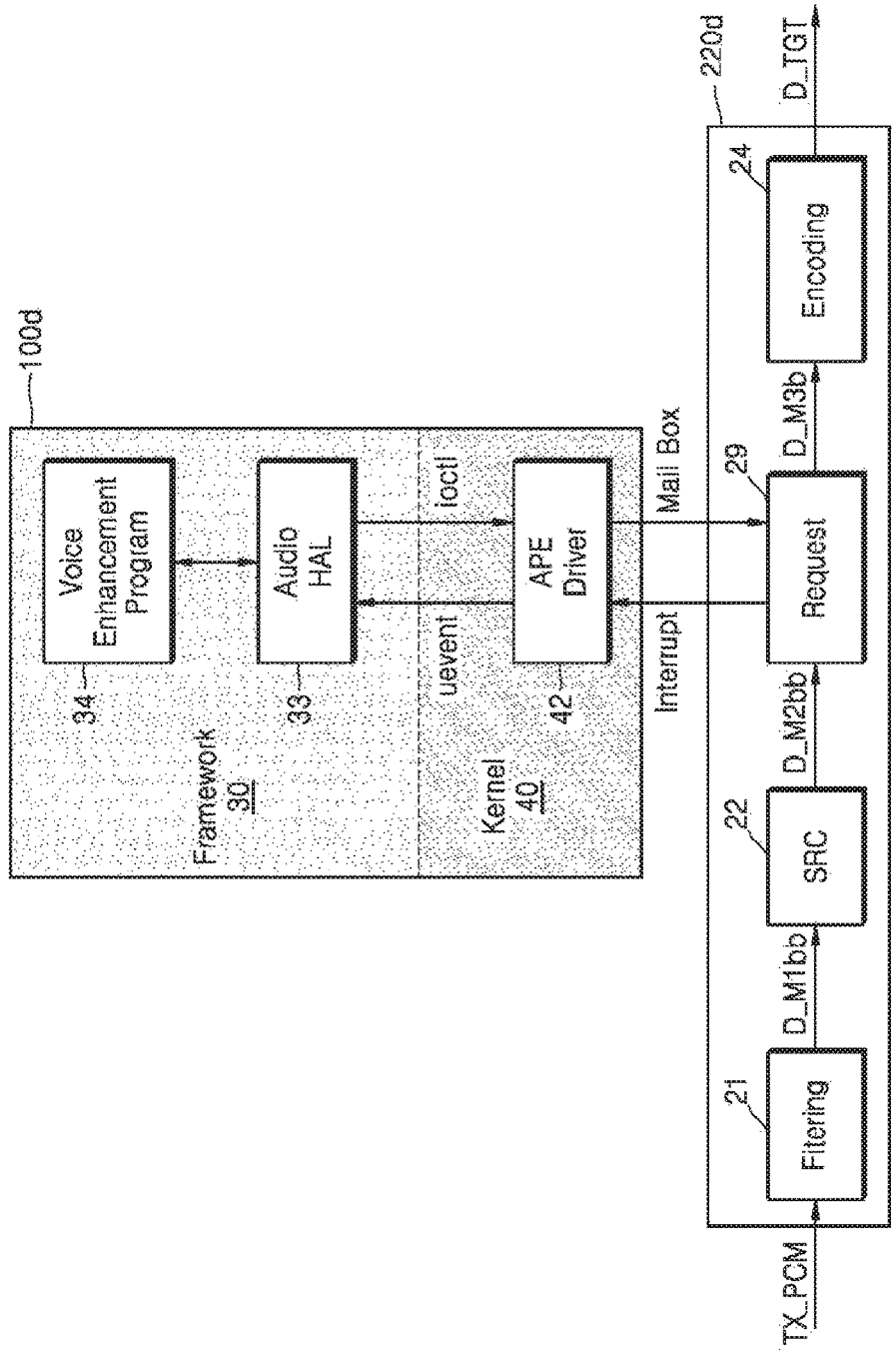

FIGS. 10A and 10B are diagrams illustrating operations of a host CPU and an audio processing engine, according to an exemplary embodiment. Specifically, FIG. 10A illustrates operations of a host CPU 100*c* and an audio processing engine 220*c* during audio playback, and FIG. 10B illustrates operations of a host CPU 100*d* and an audio processing engine 220*d* during sound recording. In the example of FIG. 10A, the processes shown in FIG. 2A may be performed on source audio data D_SRC, and the sound effect process 14 that is a process having high complexity may be performed by the host CPU 100*c*. In the example of FIG. 10B, the processes shown in FIG. 2B may be performed on TX PCM data TX_PCM, and the voice enhancement process 23 that is a process having high complexity may be performed by the host CPU 100*d*. In FIGS. 10A and 10B, each of blocks included in the host CPUs 100*c* and 100*d* or the audio processing engines 220*c* and 220*d* may be a software module including a plurality of instructions.

According to an exemplary embodiment, the host CPU 100*c* may execute an operating system. As shown in FIGS. 10A and 10B, the operating system may provide a kernel 40 that is executed in a kernel space, and a framework 30 that is executed in a user space. The kernel 40 may translate an input and output request from the user space and provide the request to hardware. The framework 30 may provide functionality to an application program, and the application program may be efficiently designed based on the framework 30.

Referring to FIG. 10A, the audio processing engine 220*c* may receive the source audio data D_SRC. For example, an audio player that is executed in the host CPU 100*c* is an application program and may extract information about the location where the source audio data D_SRC has been stored in the memory subsystem 400, in response to a user's input received from the peripherals 300 of FIG. 1. The audio processing engine 220c may receive information about the location of the source audio data D_SRC from the host CPU 100c, and thus may read the source audio data D_SRC and receive the read source audio data D_SRC.

Similar to the example of FIG. 2A, first audio data D_M1a may be generated when a decoding process 11 is performed on the source audio data D_DRC, second audio data _M2a may be generated when a VSP process 12 is performed on the first audio data D_M1a, and third audio data D_M3a may be generated when an SRC process 13 is performed on the second audio data D_M2a. Next, RX PCM data RX_PCM may be generated when the sound effect process 14 of FIG. 2A is performed on the third audio data D_M3a. According to an exemplary embodiment, the audio processing engine 220c may perform an operation 19 of requesting the host CPU 100c to perform the sound effect process 14, based on a run time of the sound effect process 14 of FIG. 2A. However, as discussed above, this is only an example, and the audio processing engine 220c may perform the operation of requesting the host CPU 100c to perform one or more of the processes (e.g., the decoding, VSP, SRC, etc. processes) of the operating method.

The request 19 for performance of the sound effect process 14 may be transmitted from the audio processing engine 220c to the host CPU 100c by using various methods. For example, as shown in FIG. 10A, the audio processing engine 220c may generate an interrupt for the host CPU 100c. Alternatively, after the host CPU 100c directs the audio processing engine 220c to play back a sound from the source audio data D_SRC, the host CPU 1000c may check through polling whether a request 19 for the performing of a process occurs from the audio processing engine 220c.

Referring to FIG. 10A, an audio processing engine (APE) driver 41 of the kernel 40 may transmit a request received from the audio processing engine 220c to a user space, in response to an interrupt generated by the audio processing engine 220c. For example, as shown in FIG. 10A, the audio processing engine driver 41 may transmit the request 19 received from the audio processing engine 220c to the user space by using "uevent" for transmitting an event generated with respect to a hardware device to a user space.

The request of the audio processing engine 220c, transmitted to the user space by the audio processing engine driver 41, may be processed by an audio hardware abstraction layer (HAL) 31. The audio HAL 31 may be provided such that an application program (for example, a sound effect program 32) does not directly process a call and a response to the hardware of the kernel 40, that is, the audio processing engine 220c, so that the application program (e.g., the sound effect program in this example) may be designed independently of the hardware and is efficiently designed.

The sound effect program 32, which is an application program, may implement a process which the audio processing engine 220c has requested the host CPU 100c to perform. In other words, the sound effect program 32 may generate RX PCM data RX_PCM by implementing the sound effect process 14 with respect to the third audio data D_M3a. In this manner, as a process for audio data is performed by an application program, the computing system 1000 may support new audio processing by adding and/or changing an application program. Accordingly, the flexibility of the computing system 1000 for audio processing may increase.

When the sound effect process 14 is completed by the sound effect program 32, the sound effect program 32 may transmit information about a result obtained by performing the sound effect process 14 to the audio processing engine (APE) driver 41 of the kernel 40 through the audio HAL 31. For example, as shown in FIG. 10A, the audio HAL 31 may transmit the information about the result of performing the sound effect process 14 to the audio processing engine driver 41 by using "ioctl" that allows an application program of a user space to communicate with a hardware device or an element of the kernel 40.

In response to a call of the audio HAL 31, the audio processing engine (APE) driver 41 may transmit the information about the result of performing the sound effect process 14 to the audio processing engine 220c. For example, as shown in FIG. 10A, the audio processing engine (APE) driver 41 may transmit the information about the result of performing the sound effect process 14 to the audio processing engine 220c by using "Mail Box" that controls communication between hardware devices through queued messages and interrupt-driven signals.

Referring to FIG. 10B, the audio processing engine 220d may receive TX PCM data TX_PCM. For example, the audio processing engine 220d may read TX PCM data TX_PCM based on information about the location where TX PCM data TX_PCM generated by the PCM mixer 600 of FIG. 1 has been stored, and may receive the read TX PCM data TX_PCM. Similar to the example of FIG. 2B, a filtering process 21, an SRC process 22, a voice enhancement process 23, and an encoding process 24 may be sequentially performed, and thus, first to third audio data D_M1b, D_M2b, and D_M3b and target audio data D_TGT may be generated. According to an exemplary embodiment, the audio processing engine 220d may perform an operation of requesting the host CPU 100d to perform the voice enhancement process 23, based on a run time of the voice enhancement process 23 of FIG. 2B. However, as discussed above, this is only an example, and the audio processing engine 220d may perform the operation of requesting the host CPU 100d to perform one or more of the processes (e.g., the filtering, SRC, encoding, etc. processes) of the operating method.

Similar to FIG. 10A, a request 29 of the audio processing engine 200d may be transmitted to a voice enhancement program 34 via an audio processing engine (APE) driver 42 and an audio HAL 33. The voice enhancement program 34 that is an application program may generate the third audio data D_M3b by realizing the voice enhancement process 23 requested by the audio processing engine 220d.

Figure 11:
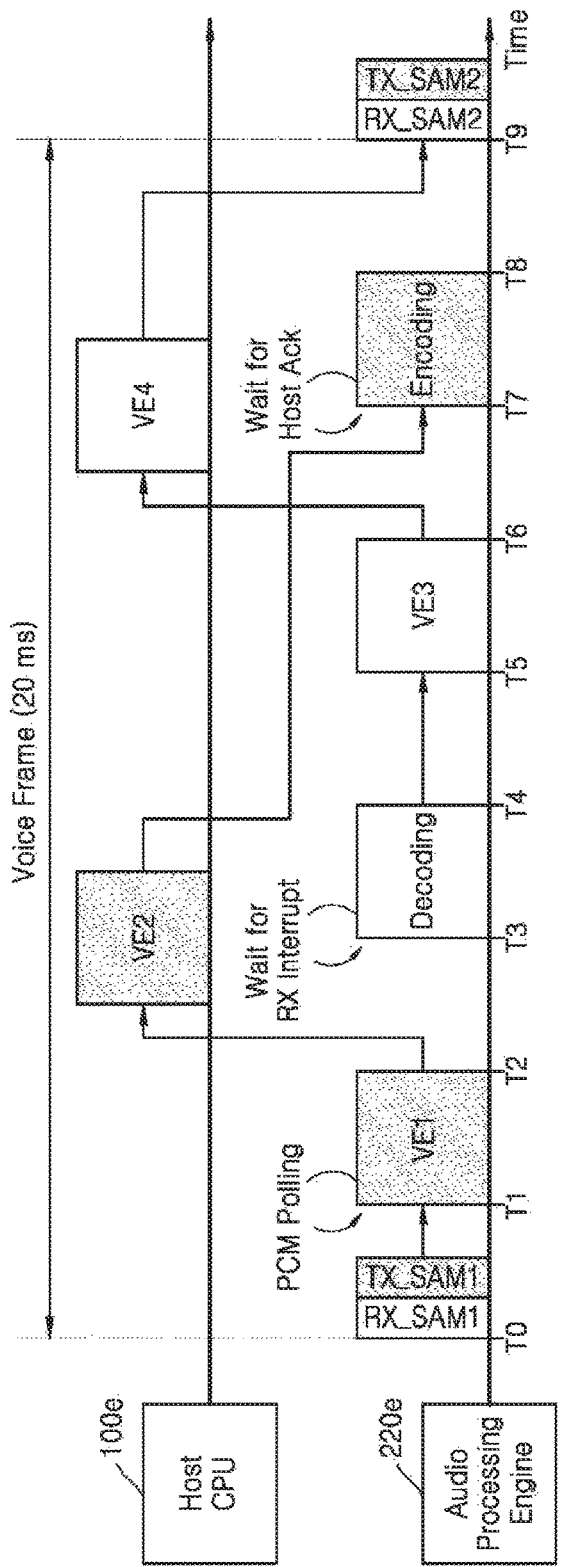
FIG. 11 is a diagram illustrating operations of a host CPU and an audio processing engine, according to an exemplary embodiment.

FIG. 11 is a diagram illustrating operations of a host CPU 100e and an audio processing engine 220e, according to an exemplary embodiment. Specifically, FIG. 11 is a diagram illustrating an operation in which RX PCM data RX_PCM and TX PCM data TX_PCM are processed in parallel in the host CPU 100e and the audio processing engine 220e. In FIG. 11, the RX PCM data RX_PCM processes are shown without shading, and the TX PCM data TX_PCM processes are shown with shading. For example, when the computing system 1000 of FIG. 1, which includes the host CPU 100e and the audio processing engine 220e of FIG. 11, is a mobile phone, an operation of processing TX PCM data TX_PCM generated from a voice of a user by the PCM mixer 600 and an operation of generating RX PCM data RX_PCM from audio data received from a terminal (for example, a mobile phone) of the other party may be performed in parallel by the host CPU 100e and the audio processing engine 220e. Accordingly, the computing system 1000 may provide a high throughput.

The RX PCM data RX_PCM may include a plurality of samples RX_SAM1 and RX_SAM2 aligned at regular time intervals, and the TX PCM data TX_PCM may include a plurality of samples TX_SAM1 and TX_SAM2 aligned at regular time intervals. For example, as shown in FIG. 11, a time interval between two adjacent samples (for example, RX_SAM1 and RX_SAM2) may be about 20 milliseconds (ms). When PCM data, that is, the TX PCM data TX_PCM and the RX PCM data RX_PCM, correspond to a voice as in a mobile phone, a time interval between the samples may be referred to as a voice frame. The samples RX_SAM1 and RX_SAM2 of the RX PCM data RX_PCM and the samples TX_SAM1 and TX_SAM2 of the TX PCM data TX_PCM are processed or generated within a voice frame so that a sound may be normally output or recorded. According to an exemplary embodiment, as a complicated process is performed by the host CPU 100e, the samples RX_SAM1 and RX_SAM2 of the RX PCM data RX_PCM and the samples TX_SAM1 and TX_SAM2 of the TX PCM data TX_PCM may be processed or generated within a voice frame.

Referring to FIG. 11, the audio processing engine 220e may check through polling whether a sample of the TX PCM data TX_PCM is generated. Accordingly, as shown in FIG. 11, the audio processing engine 220e may perform, at a time T1, a first voice enhancement process VE1 as a process for the sample TX_SAM1 of the TX PCM data TX_PCM.

At a time T2 at which the first voice enhancement process VE1 is ended, the audio processing engine 220e may determine whether to perform a second voice enhancement process VE2 to be performed subsequent to the first voice enhancement process VE1. In other words, when the audio processing engine 220e directly performs the second voice enhancement process VE2 based on a run time of the second voice enhancement process VE2, the audio processing engine 220e may determine whether the second voice enhance process VE2 and an encoding process may be completed before the sample TX_SAM2 of the TX PCM data TX_PCM is generated. In addition, since the sample TX_SAM1 of the TX PCM data TX_PCM and the sample RX_SAM1 of the RX PCM data RX_PCM are processed or generated within 20 ms in order to output or record sound normally, as described above, the audio processing engine 220e may consider run times of processes for the RX PCM data RX_PCM as well as processes for the TX PCM data TX_PCM.

As shown in FIG. 11, the audio processing engine 220e may request the host CPU 100e to perform the second voice enhancement process VE2, and the host CPU 100e may perform the second voice enhancement process VE2 in response to the request of the audio processing engine 220e. When the second voice enhancement process VE2 is completed, the host CPU 100e may inform the audio processing engine 220e of the completion of the second voice enhancement process VE2.

After the audio processing engine 220e requests the host CPU 100e to perform the second voice enhancement process VE2, the audio processing engine 220e may use an interrupt and thus recognize that audio data to be output as a sound through the speaker 700 is received from the other party terminal. Accordingly, as shown in FIG. 11, the audio processing engine 220e may perform, at a time T3, a process of decoding received audio data.

At a time T4, the audio processing engine 220e may complete the process of decoding the received audio data and determine whether to perform a third voice enhancement process VE3. At a time T5, the audio processing engine 220e may perform the third voice enhancement process VE3 based on a run time of the third voice enhancement process VE3.

At a time T6, the audio processing engine 220e may complete the third voice enhancement process VE3 and determine whether to perform a fourth voice enhancement process VE4. Based on a run time of the fourth voice enhancement process VE4, the audio processing engine 220e may request the host CPU 100e to perform the fourth voice enhancement process VE4, and the host CPU may perform the fourth voice enhancement process VE4 in response to the request of the audio processing engine 220e.

After the audio processing engine 220e requests the host CPU 100e to perform the fourth voice enhancement process VE4, the audio processing engine 220e may wait until the second voice enhancement process VE2 for the sample TX_SAM1 of the TX PCM data TX_PCM is completed by the host CPU 100e. As shown in FIG. 11, since the second voice enhancement process VE2 is completed by the host CPU 100e before the time T4, the audio processing engine 220e may perform, at a time T7, an encoding process on result data obtained by performing the second voice enhancement process VE2. The encoding process may be completed at a time T8, and encoded audio data may be transmitted to the other party terminal device. At a time T9, the audio processing engine 220e may transmit the sample RX_SAM2 of the RX PCM data RX_PCM, which is a result of the fourth voice enhancement process VE4 performed by the host CPU 100e, to the PCM mixer 600.

Figure 12:
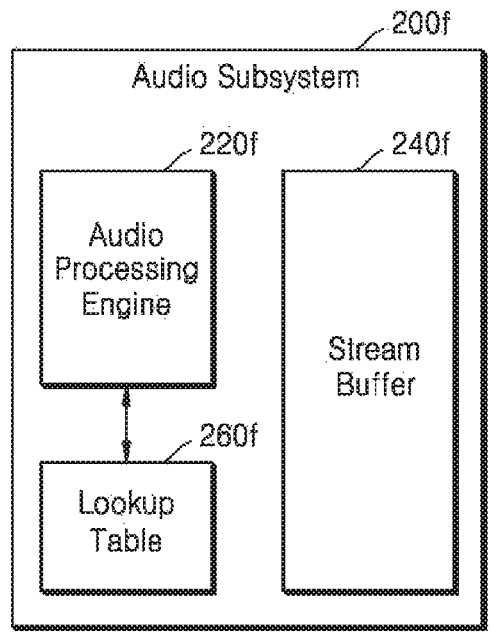
FIG. 12 is a block diagram of an audio subsystem according to an exemplary embodiment.

FIG. 12 is a block diagram of an audio subsystem 200f according to an exemplary embodiment. As described above with reference to FIG. 1, the audio subsystem 200f may generate RX PCM data RX_PCM by processing source audio data, and/or may generate target audio data by processing TX PCM data TX_PCM.

As shown in FIG. 12, the audio subsystem 200f may include an audio processing engine 220f, a stream buffer 240f, and a lookup table 260f. The audio processing engine 220f and the stream buffer 240f of FIG. 12 may be similar to the audio processing engine 220a and the stream buffer 240a of FIG. 4, respectively.

The lookup table 260f may store information about run times of processes for audio data. For example, the lookup table 260f may store a time, which is taken to perform a first process on a predetermined number of samples, as information about a run time of the first process. In order to determine whether it is possible to perform the first process, based on the run time of the first process, as described above with reference to FIG. 3, the audio processing engine 220f may access the lookup table 260f and acquire information about the run time of the first process. Details of the lookup table 260f will be described below with reference to FIG. 13.

Figure 13:
FIG. 13 is a diagram illustrating an example of a lookup table for the audio subsystem of FIG. 12, according to an exemplary embodiment.

FIG. 13 is a diagram illustrating a lookup table 260f corresponding to an example of the lookup table 260f of FIG. 12, according to an exemplary embodiment. As described above with reference to FIG. 12, the lookup table 260f may store information about run times of processes for audio data. Referring to FIG. 13, the lookup table 260f may include information about run times of four processes, i.e., first to fourth processes P1 to P4.

The computing system 1000 of FIG. 1 may support a plurality of operation modes. For example, the computing system 1000 may support a normal mode, a power saving mode (e.g., a sleep mode), a deep sleep mode, and the like, and elements of the computing system 1000 may operate depending on a set mode. For example, the audio processing engine 220f of FIG. 12 may reduce an operating speed during the power saving mode or the deep sleep mode.

Accordingly, the lookup table 260f may store information about run times of processes corresponding to a plurality of modes.

Referring to FIG. 13, the audio processing engine 220f may support first to third modes, and may store information about run times of the first to fourth processes P1 to P4 corresponding to the first to third modes. For example, the first process P1 may have run times of 40 ms, 50 ms, and 60 ms in the first to third modes, respectively, and the second process P2 may have run times of 55 ms, 65 ms, and 75 ms in the first to third modes, respectively, etc.

According to an exemplary embodiment, the lookup table 260f may be updated. For example, the host CPU 100 of FIG. 1 may acquire information about a run time of a new process from the peripherals 300 or the memory subsystem 400. The audio subsystem 200f may receive the information about a run time of a new process, and the lookup table 260f may be updated depending on the received information.

Figure 14:
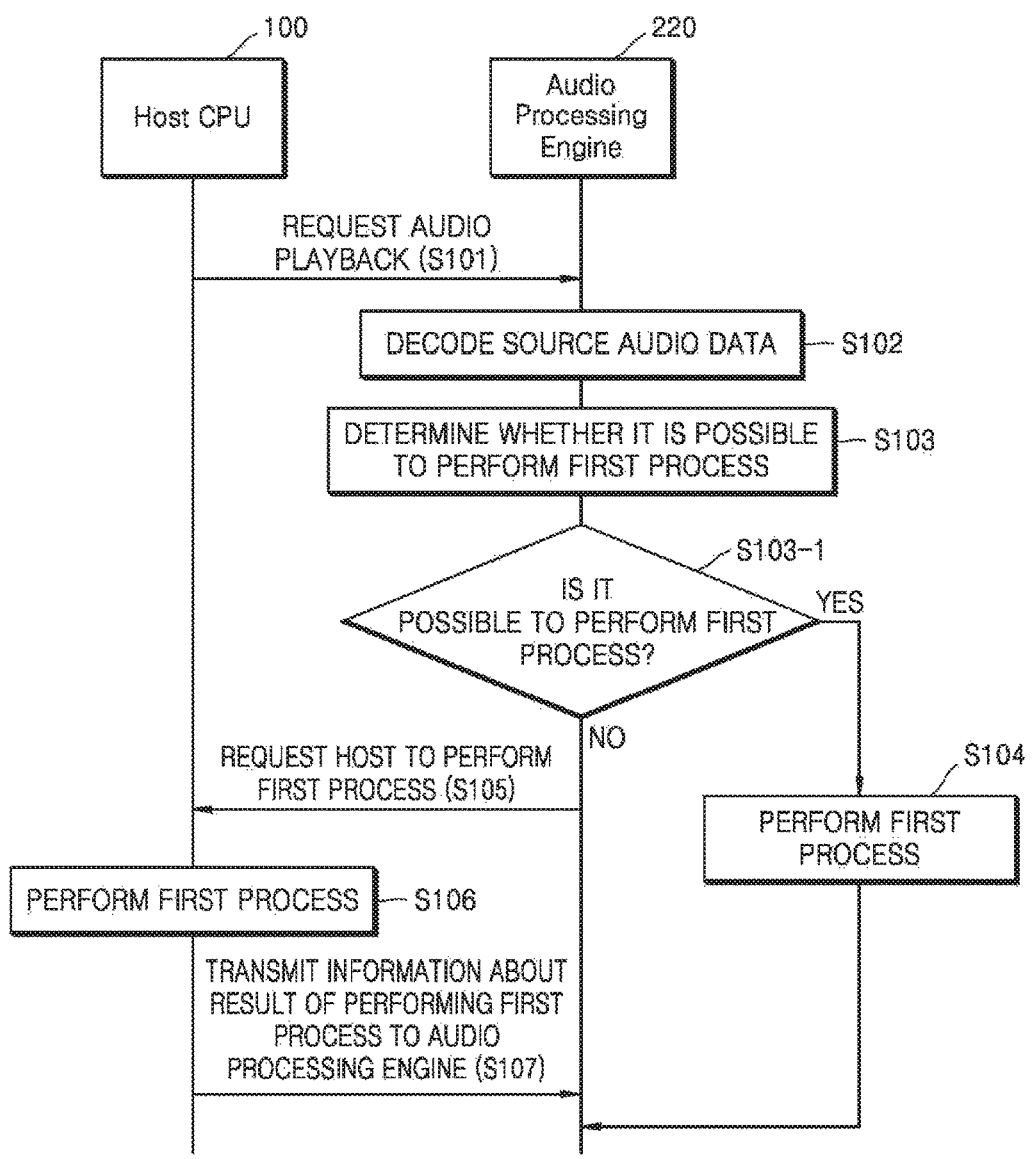
FIG. 14 is a diagram that illustrates an operation between a host CPU and an audio processing engine, according to an exemplary embodiment.

FIG. 14 is a diagram that illustrates an operation between a host CPU 100 and an audio processing engine 220, according to an exemplary embodiment. Specifically, FIG. 14 sequentially illustrates an operation between the host CPU 100 and the audio processing engine 220 during audio playback.

In operation S101, the host CPU 100 may request the audio processing engine 220 to play back an audio. For example, the host CPU 100 may transmit information for accessing source audio data and information about processes to be performed on the source audio data to the audio processing engine 220, in response to a user input.

In operation S102, the audio processing engine 220 may decode the source audio data. For example, the source audio data may be data compressed by using an audio codec, and the audio processing engine 220 may generate stream data by decoding the source audio data.

In operation S103, the audio processing engine 220 may determine whether it is possible to perform a first process. In FIG. 14, the first process may be, for example, one of a plurality of post-processes that are performed on audio data. For example, information about processes, transmitted to the audio processing engine 220 when the host CPU 100 requests audio playback, may include information about the first process, and the audio processing engine 220 may determine whether to perform the first process in the audio processing engine 220, based on a run time of the first process.

If it is determined in operation S103-1 that it is possible to perform the first process (S103-1, YES), the audio processing engine 220 may perform the first process in operation S104. If it is determined in operation S103-1 that it is not possible to perform the first process (S103-1, NO), the audio processing engine 220 may request the host CPU 100 to perform the first process in operation S105. For example, the audio processing engine 220 may generate an interrupt for the host CPU 100, and may transmit information for performing the first process to the host CPU 100.

In operation S106, the host CPU 100 may perform the first process. For example, the host CPU 100 may execute a kernel and an application program that is executed on the kernel, and the host CPU 100 may perform the first process by using the application program.

In operation S107, the host CPU 100 may transmit information about a result of performing the first process to the audio processing engine 220. For example, the host CPU 100 may transmit error information and log information, related to the performing of the first process, as well as a signal indicating the completion of the performing of the first process to the audio processing engine 220.

Figure 15:
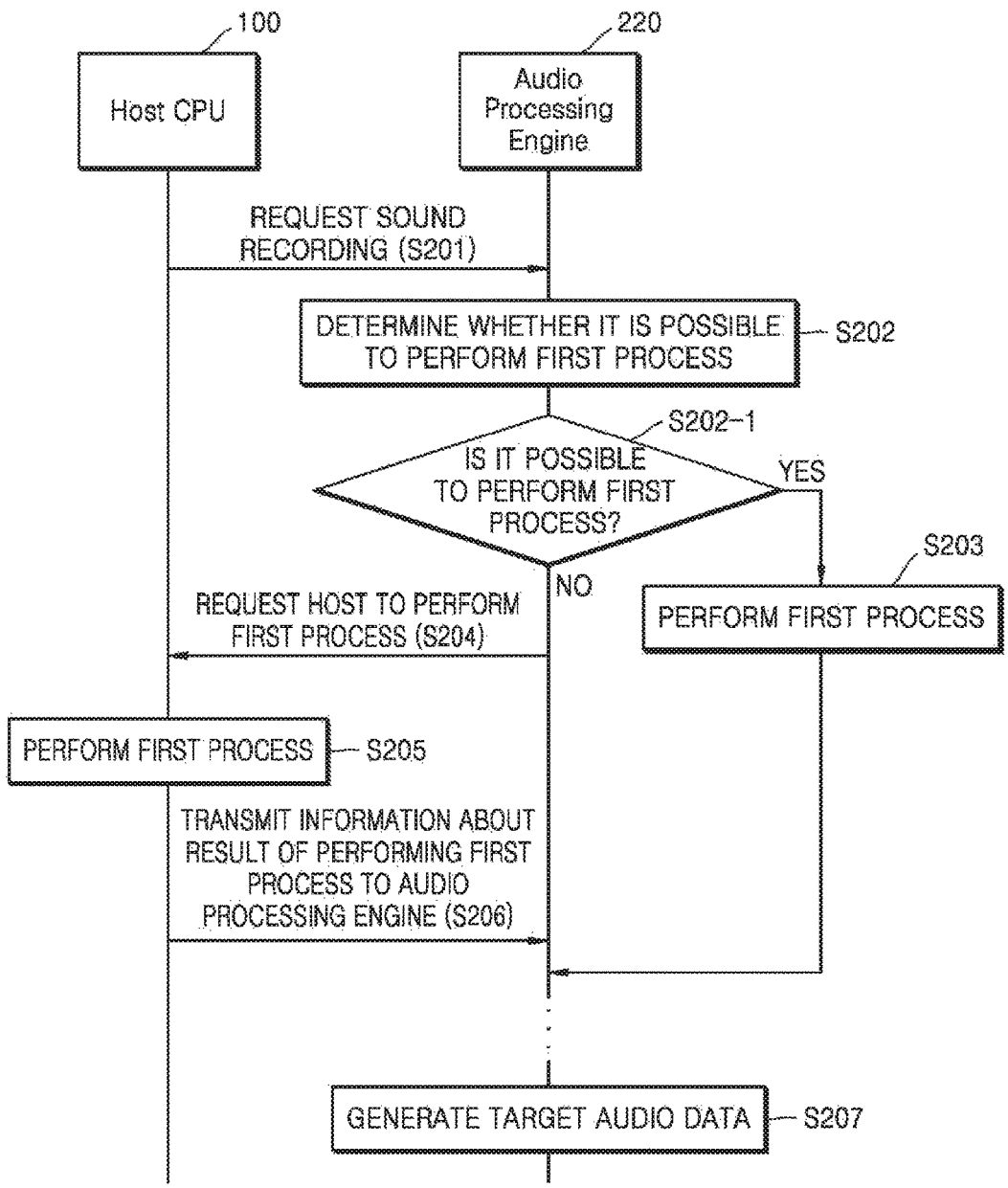
FIG. 15 is a diagram that illustrates an operation between a host CPU and an audio processing engine, according to an exemplary embodiment.

FIG. 15 is a diagram that sequentially illustrates an operation between a host CPU 100 and an audio processing engine 220, according to an exemplary embodiment. Specifically, FIG. 15 sequentially illustrates an operation between the host CPU 100 and the audio processing engine 220 during sound recording.

In operation S201, the host CPU 100 may request the audio processing engine 220 to record a sound. For example, the host CPU 100 may transmit information about processes to be performed on TX PCM data TX_PCM and information about an address where target audio data is to be stored, to the audio processing engine 220 to record a voice of a user when a call function is activated.

In operation S202, the audio processing engine 220 may determine whether it is possible to perform a first process. In FIG. 15, the first process may be one of a plurality of pre-processes that are performed on TX PCM data TX_PCM. For example, information about processes, transmitted to the audio processing engine 220 when the host CPU 100 requests sound recording, may include information about the first process, and the audio processing engine 220 may determine whether to perform the first process in the audio processing engine 220, based on a run time of the first process.

If it is determined in operation S202-1 that it is possible to perform the first process (S202-1, YES), the audio processing engine 220 may perform the first process in operation S203. If it is determined in operation S202-1 that it is not possible to perform the first process (S202-1, NO), the audio processing engine 220 may request the host CPU 100 to perform the first process in operation S204. For example, the audio processing engine 220 may generate an interrupt for the host CPU 100, and may transmit information for performing the first process to the host CPU 100.

In operation S205, the host CPU 100 may perform the first process. In operation S206, the host CPU 100 may transmit information about a result of performing the first process to the audio processing engine 220. The audio processing engine 220 may directly perform an additional pre-process on data obtained by performing the first process or request the host CPU 100 to perform an additional pre-process.

In operation S207, the audio processing engine 220 may generate target audio data. In other words, after pre-processes, which are transmitted to the audio processing engine 220 when the host CPU 100 requests sound recording in operation S201, are completely performed, the audio processing engine 220 may generate target audio data by encoding data. The generated target audio data may be stored in the computing system 1000 or transmitted to the outside of the computing system 1000.

Figure 16:
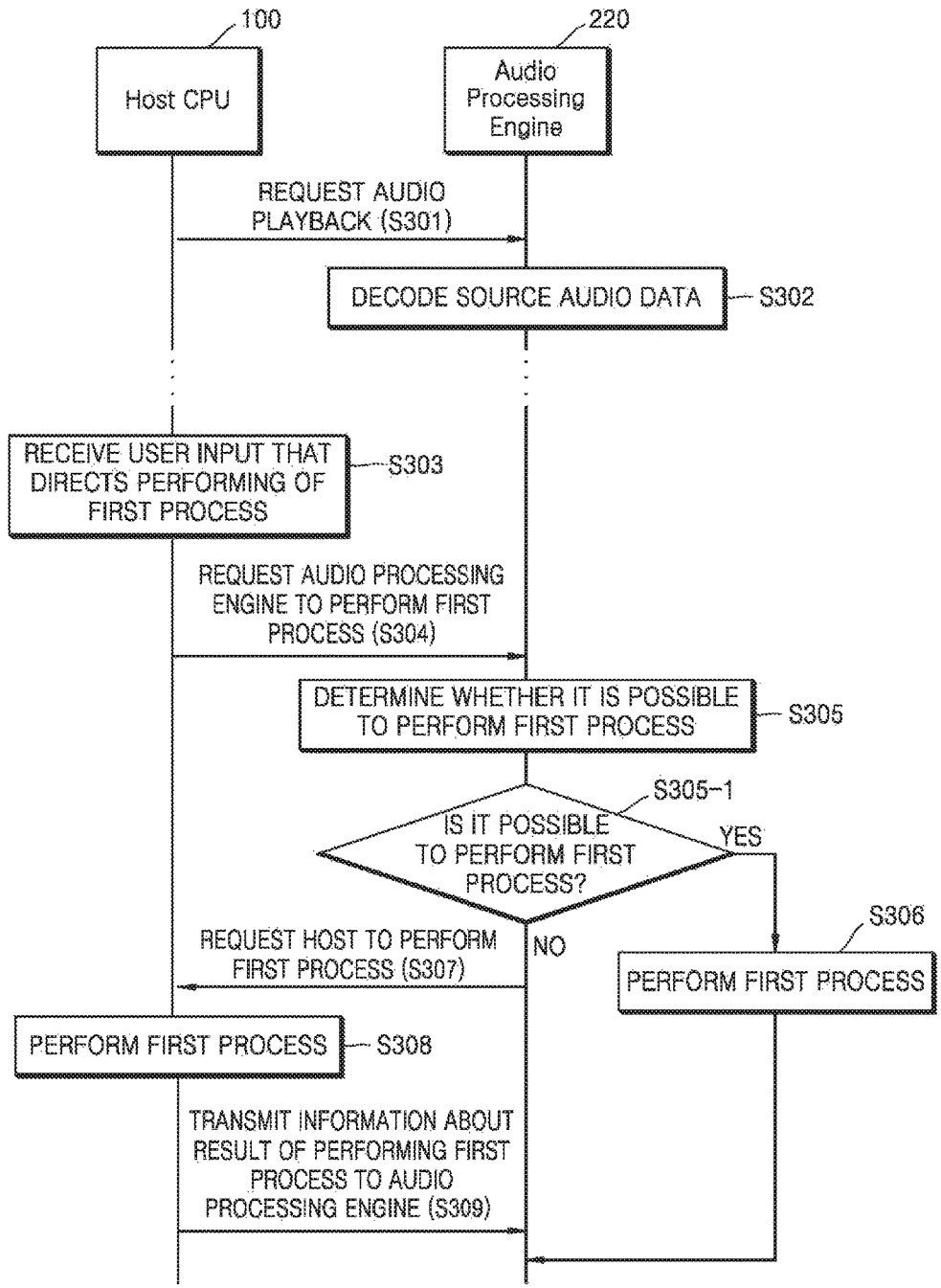
FIG. 16 is a diagram that illustrates an operation between a host CPU and an audio processing engine, according to an exemplary embodiment.

FIG. 16 is a diagram that sequentially illustrates an operation between a host CPU 100 and an audio processing engine 220, according to an exemplary embodiment. Specifically, FIG. 16 sequentially illustrates an operation between the host CPU 100 and the audio processing engine 220 when a user provides an input regarding audio playback while play backing an audio.

In operation S301, the host CPU 100 may request the audio processing engine 220 to play back an audio. In operation S302, the audio processing engine 220 may decode source audio data. The audio processing engine 220 may further perform at least one process on stream data generated by decoding the source audio data.

During audio playback, the host CPU 100 may receive a user input that directs the performing of a first process in operation S303. For example, a user may activate a sound effect function, and in this case, the host CPU 100 may interpret an input of the user as directing a sound effect process.

In operation S304, the host CPU 100 may request the audio processing engine 220 to perform the first process. For example, the host CPU 100 may request the audio processing engine 220 to perform the first process, by using "Mail Box" of FIG. 10A. In an exemplary embodiment, the host CPU 100 may transmit information about a run time of the first process to the audio processing engine 220 in addition to requesting the audio processing engine 220 to perform the first process. In other words, the audio processing engine 220 may refer to information about a run time of the first process, received from the host CPU 100, as well as the lookup table 260f as described above with reference to FIG. 13.

In operation S305, the audio processing engine 220 may determine whether it is possible to perform the first process, based on the run time of the first process. If it is determined in operation S305-1 that it is possible to perform the first process (S305-1, YES), the audio processing engine 220 may perform the first process in operation S306. If it is determined in operation S305-1 that it is not possible to perform the first process (S-305-1, NO), the audio processing engine 220 may request the host CPU 100 to perform the first process in operation S307. In operation S308, the host CPU 100 may perform the first process in response to the request of the audio processing engine 220. In operation S309, the host CPU 100 may transmit information about a result of performing the first process to the audio processing engine 220.

Figure 17:
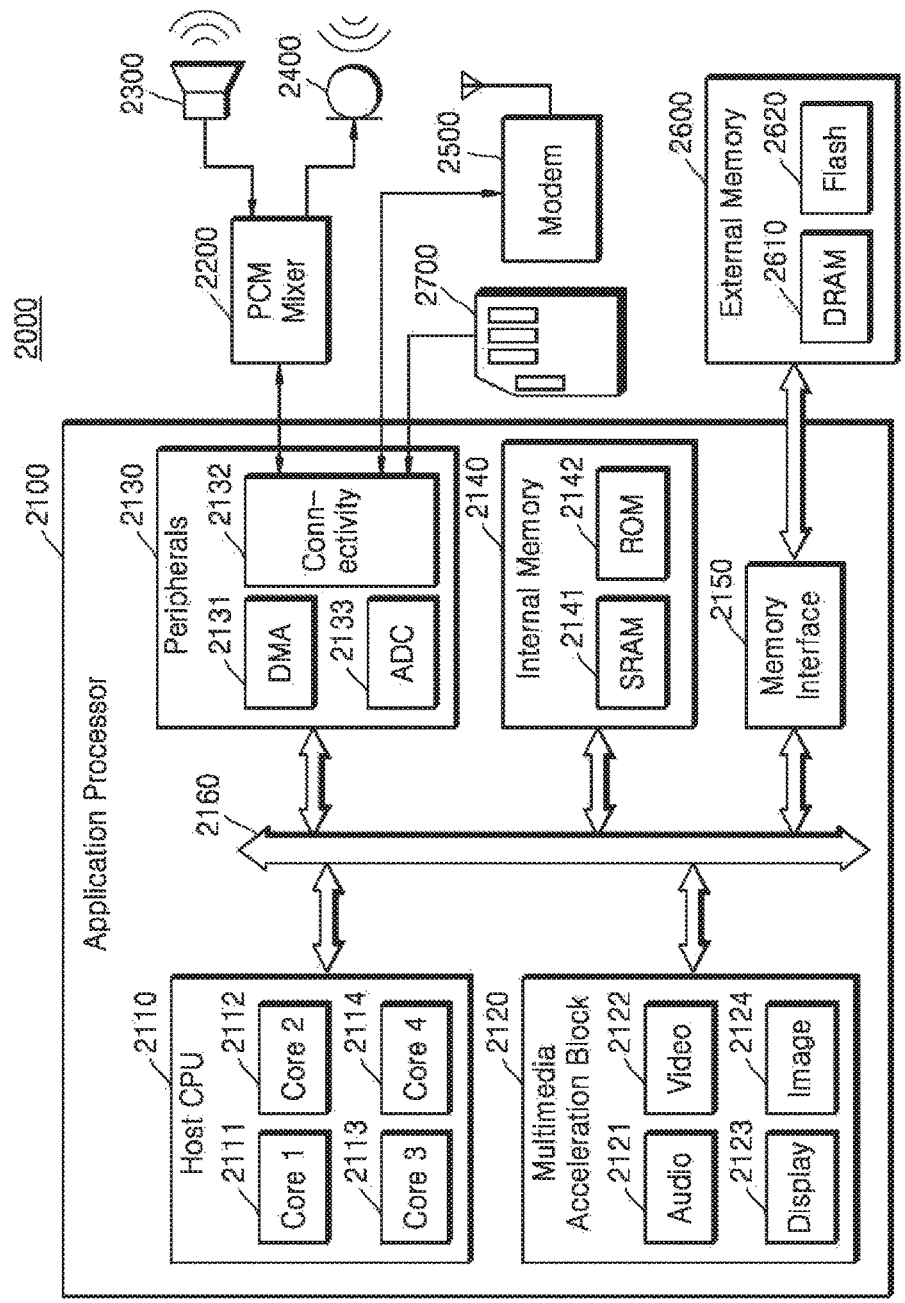
FIG. 17 is a block diagram of a computing system operating as an offload audio processing system according to an exemplary embodiment.

FIG. 17 is a block diagram of a computing system 2000 as an offload audio processing system according to an exemplary embodiment. Similar to the computing system 1000 of FIG. 1, the computing system 2000 may be a system that may play back a sound and/or record a sound. As a non-limiting example, the computing system 2000 may be implemented as a PC, a tablet PC, a mobile phone, a smart phone, an e-reader, a PDA, an EDA, a digital still camera, a digital video camera, a PMP, a PND, or a handheld game console.

As shown in FIG. 17, the computing system 2000 may include an application processor (AP) 2100, a PCM mixer 2200, a speaker 2300, a microphone 2400, a modem 2500, an external memory 2600, and a memory card 2700.

An application processor 2100, which is a system-on-chip (SoC) for activating an operating system for the computing system 2000 and applications, may control other elements of the computing system 2000. As shown in FIG. 17, the application processor 2100 may include a host CPU 2110, a multimedia acceleration block 2120, peripherals 2130, an internal memory 2140, and a memory interface 2150. Elements of the application processor 2100 may be connected to a system bus 2150 to communicate with one another, and the system bus 2150 may be a multi layer bus.

As shown in FIG. 17, the host CPU 2110 may include a plurality of cores 2111 to 2114, and each of the plurality of cores 2111 to 2114 may independently execute instructions. The host CPU 2110 may include hierarchical cache memories. The number of cores shown in FIG. 17 is only an example, and the host CPU 2110 may include less than four cores or more than four cores. According to an exemplary embodiment, the host CPU 2110 may perform an audio process in response to a request of an audio processing engine (for example, a processor included in an audio processing module 2121).

The multimedia acceleration block 2120 may include a plurality of logic blocks that process multimedia data. Each of the plurality of logic blocks of the multimedia acceleration block 2120 may serve to process multimedia data and thus increase efficiencies of the application processor 2100 and the computing system 2000. For example, as shown in FIG. 17, the multimedia acceleration block 2120 may include the audio processing module (Audio) 2121, a video processing module (Video) 2122, a display driving module (Display) 2123, and an image processing module (Image) 2124. The audio processing module (Audio) 2121 may process source audio data and generate data for play backing a sound, that is, RX PCM data RX_PCM. Also, the audio processing module (Audio) 2121 may process TX PCM data TX_PCM generated from a sound and generate target audio data. The video processing module (Video) 2122 may decode source video data compressed by a video codec. The display driving module (Display) 2123 may generate data corresponding to a signal that is provided to a display device of the computing system 2000. The image processing module (Image) 2124 may decode source image data compressed by an image codec.

According to an exemplary embodiment, the audio processing module (Audio) 2121 may function as any one of the audio processing engines according to the exemplary embodiments described above, and may determine whether a process for audio data may be performed. Accordingly, even if the audio processing module (Audio) 2121 does not have excessively high performance, a process having high complexity may be performed by the host CPU 2110 instead of the audio processing module 2121.

The peripherals 2130 may include a plurality of logic blocks, each of which performs various functions. For example, as shown in FIG. 17, the peripherals 2130 may include a direct memory access controller (DMA) 2131, a connectivity module (Connectivity) 2132, and an analog to digital converter (ADC) 2133.

The DMA controller 2131 may control a DMA operation that is performed through the system bus 2150. For example, the DMA controller 2131 may control an operation in which the host CPU 2110 is not involved and the audio processing module 2121 accesses data stored in the internal memory 2140 or data stored in the external memory 2600 through the memory interface 2150.

The connectivity module 2131 may include a plurality of logic blocks that support a communication standard for communicating with the application processor 2100, the other elements of the computing system 2000, or an external device of the computing system 200. For example, as shown in FIG. 17, the connectivity module 2132 may include a logic block that supports a serial bus interface standard such as an I2S interface, and may transmit PCM data generated by the audio processing module 2121 to the PCM mixer 2200, which generates an analog signal from the PCM data, through the I2S interface.

Referring to FIG. 17, the connectivity module 2132 may include a logic block that supports a communication with the modem 2500. The modem 200 may provide an interface through which the computing system 2000 communicates with another computing system outside the computing system 2000. For example, the modem 2500 may provide an interface for wireless mobile communication, and may receive source audio data from another computing system through an antenna and transmit target audio data to another computing system.

Also, the connectivity module 2132 may include a logic block that supports a card interface, such as an interface of a compact flash card (CFC), an interface of a microdrive, an interface of a smart media card (SMC), an interface of a multimedia card (MMC), an interface of a security digital card (SDC), or an interface of a memory stick. The connectivity module 2132 may read source audio data from the memory card 2700, and may transmit read source audio data to the audio processing module 2121, the internal memory, or the external memory 2600. The ADC 2133 may receive an analog signal and output digital data. For example, the ADC 2133 may be used for converting a user input received through a touch screen included in the computing system 2000 into digital data. The host CPU 2110 may refer to output data of the ADC 2133 of the peripherals 2130 to analysis a user input.

The internal memory 2140, which is a memory subsystem included in the application processor 2100, may be connected to the system bus 2150 to communicate with another element. As shown in FIG. 17, the internal memory 2140 may include an SRAM 2141 and a read only memory (ROM) 2142, and elements of the application processor 2100 may access the SRAM 2141 and the ROM 2142 via the system bus 2150.

The memory interface 2150 may provide an interface between the application processor 2100 and the external memory 2600. For example, the external memory 2600 may include a DRAM 2601 and a flash memory (Flash) 2620, and the memory interface 2150 may include a DRAM controller and a flash controller. Audio data, which is generated while the audio processing module 2121 performs audio processing, and/or audio data, which is generated while the host CPU 2110 performs a process depending on a request of an audio processing engine of the audio processing module 2121, may be stored in the DRAM 2610 of the external memory 2600 or the SRAM 2141 of the internal memory 2140.

Figure 18:
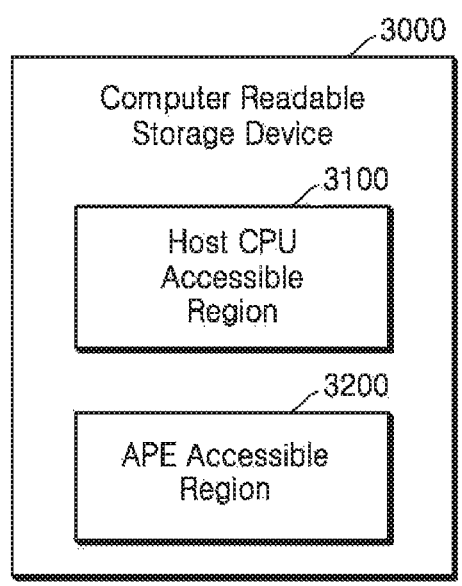
FIG. 18 is a diagram illustrating a computer readable storage device according to an exemplary embodiment.

FIG. 18 is a diagram illustrating a computer readable storage device 3000 according to an exemplary embodiment. The computer readable storage device 3000 may include a storage device that may be read by a computer while being used for providing instructions and/or data to the computer. For example, the computer readable storage device 3000 may include a magnetic or optical medium, such as a disk, a tape, CD-ROM, DVD-ROM, CD-R, CD-RW, DVD-R, or DVD-RW, a volatile or non-volatile memory, such as RAM, ROM, or a flash memory, a non-volatile memory that is accessible through an USB interface, and/or microelectromechanical systems (MEMS). The computer readable storage device 3000 may be inserted in a computer, integrated in a computer, or combined with a computer through a communication medium such as a network and/or a wireless link. Referring to FIG. 18, the computer readable storage device 3000 may include an area 3100 that is accessible by the host CPU 100 and an area 3200 that is accessible by the audio processing engine 220.

The area 3100 that is accessible by the host CPU 100 may include a program including a plurality of instructions that are executed by the host CPU 100 to perform an audio processing method according to an exemplary embodiment, and the host CPU 100 may access the area 3100 and execute the plurality of instructions. For example, the area 3100 that is accessible by the host CPU 100 may include instructions corresponding to at least one selected from the audio processing engine driver 41, the audio HAL 31, and the sound effect program 32, shown in FIG. 10A.

The area 3200 that is accessible by the audio processing engine 220 may include a program including a plurality of instructions that are executed by the audio processing engine 220 to perform an audio processing method according to an exemplary embodiment, and the audio processing engine 220 may access the area 3200 and execute the plurality of instructions. For example, the area 3200 that is accessible by the audio processing engine 220 may include instructions corresponding to at least one selected from the decoding process 11, the VSP process 12, and the SRC process 13, shown in FIG. 10A, and may include instructions corresponding to an operation (a request process 19 of FIG. 10A) of requesting the host CPU 100 to perform a process. Also, the area 3200 that is accessible by the audio processing engine 220 may include instructions corresponding to at least one selected from the filtering process 21, the SRC process 22, and the encoding process 24, shown in FIG. 10B, and may include instructions corresponding to an operation (a request process 29 of FIG. 10B) of requesting the host CPU 100 to perform a process.

Although in FIG. 18 a single computer readable storage device 3000 includes both the area 3100 that is accessible by the host CPU 100 and the area 3200 that is accessible by the audio processing engine 220, the inventive concept is not limited thereto. For example, the area 3100 that is accessible by the host CPU 100 and the area 3200 that is accessible by the audio processing engine 220 may be included in two or more different storage devices.

While exemplary embodiments have been particularly shown and described, it will be understood that various changes in form and details may be made therein without departing from the spirit and scope of the following claims.

What is claimed is:

1. An audio processing method that is performed by a computing system comprising a host central processing unit (CPU) and an audio processing engine, the audio processing method comprising:
   determining, by the audio processing engine, whether it is possible for the audio processing engine to perform a first process for first audio data, based on a run time of the first process for the first audio data; and
   performing, by the audio processing engine, the first process or requesting, by the audio processing engine, the host CPU to perform the first process, based on a result of the determining.

2. The audio processing method of claim 1, wherein the audio processing engine requests the host CPU to perform the first process, and
   wherein the audio processing method further comprises generating, by the host CPU, second audio data by performing the first process in response to the requesting by the audio processing engine.

3. The audio processing method of claim 1, wherein the computing system further comprises a stream buffer, and
   wherein the determining comprises:
   determining whether the performing of the first process causes an underrun or overflow to occur in the stream buffer; and
   determining that it is not possible for the audio processing engine to perform the first process in response to determining that the underrun or overflow occurs, and determining that it is possible for the audio processing engine to perform the first process in response to determining that the underrun or overflow does not occur.

4. The audio processing method of claim 1, wherein a run time of the first process in the host CPU is shorter than a run time of the first process in the audio processing engine.

5. The audio processing method of claim 1, wherein the audio processing engine comprises a lookup table that stores information about the run time of the first process, and
wherein the determining comprises acquiring the information about the run time of the first process by referring to the lookup table.

6. The audio processing method of claim 1, further comprising requesting, by the host CPU, the audio processing engine to perform the first process, in response to an input received from the outside of the computing system,
wherein the determining is performed by the audio processing engine in response to the request from the host CPU.

7. The audio processing method of claim 6, wherein the requesting by the host CPU comprises transmitting information about a run time of the first process in the audio processing engine to the audio processing engine.

8. The audio processing method of claim 2, wherein the requesting by the audio processing engine comprises:
sending an interrupt to the host CPU; and
transmitting information for the performing of the first process to the host CPU.

9. The audio processing method of claim 8, wherein the information comprises access information with respect to the first and second audio data, and parameters of the first process.

10. The audio processing method of claim 1, wherein the first process is one of a plurality of processes of post-processing, the post-processing being performed on stream data generated by decoding source audio data.

11. The audio processing method of claim 1, wherein the first process is one of a plurality of processes of preprocessing, the preprocessing being performed on stream data before the stream data is encoded to target audio data.

12. The audio processing method of claim 2, further comprising:
transmitting, by the host CPU, information about completion of the first process to the audio processing engine; and
generating, by the audio processing engine, third audio data by performing a second process for the second audio data.

13. The audio processing method of claim 2, wherein the request from the audio processing engine is processed by a kernel that is executed in the host CPU, and the first process is performed by an application program that is executed in the host CPU.

14. An audio processing method that is performed by a computing system comprising a host central processing unit (CPU) and an audio processing engine, the audio processing method comprising:
transmitting, by the host CPU, information about a plurality of processes for audio data to the audio processing engine;
determining, by the audio processing engine, whether it is possible for the audio processing engine to perform the plurality of processes, based on run times of the plurality of processes; and
performing, by the audio processing engine, at least one of the plurality of processes or requesting, by the audio processing engine, the host CPU to perform the at least one of the plurality of processes, based on a result of the determining.

15. The audio processing method of claim 14, wherein the audio processing engine requests the host CPU to perform the at least one of the plurality of processes, and
wherein the audio processing method further comprises performing, by the host CPU, the at least one of the plurality of processes in response to the request from the audio processing engine.

16. The audio processing method of claim 14, wherein the computing system further comprises a stream buffer,
wherein the determining comprises:
determining whether the performing of the at least one of the plurality of processes causes an underrun or overflow to occur in the stream buffer; and
determining that it is not possible to perform the at least one of the plurality of processes in response to determining that the underrun or overflow occurs, and determining that it is possible to perform the at least one of the plurality of processes in response to determining that the underrun or overflow does not occur.

17. The audio processing method of claim 14, wherein a run time of the at least one of the plurality of processes in the host CPU is shorter than a run time of the at least one of the plurality of processes in the audio processing engine.

18. The audio processing method of claim 14, wherein the audio processing engine comprises a lookup table storing information about the run times of the plurality of processes, and
wherein the determining comprises acquiring information about the run times by referring to the lookup table.

19. A computing system for performing audio processing, the computing system comprising:
a host central processing unit (CPU); and
an audio processing engine provided separately from the host CPU, the audio processing engine configured to determine whether it is possible for the audio processing engine to perform a first process for first audio data, based on a run time of the first process for the first audio data, and to perform the first process by the audio processing engine or request the host CPU to perform the first process, based on a result of the determination.

20. The computing system of claim 19, wherein the audio processing engine requests the host CPU to perform the first process, and
wherein the host CPU generates second audio data by performing the first process in response to the request from the audio processing engine.

* * * * *